United States Patent
Giles et al.

(10) Patent No.: US 7,742,842 B2
(45) Date of Patent: Jun. 22, 2010

(54) NETWORKED DIAGNOSTIC AND CONTROL SYSTEM FOR DISPENSING APPARATUS

(75) Inventors: Durham Kenimer Giles, Davis, CA (US); Duane Needham, San Francisco, CA (US)

(73) Assignee: Capstan Ag Systems, Inc., Pasadena, CA (US)

( * ) Notice: Subject to any disclaimer, the term of this patent is extended or adjusted under 35 U.S.C. 154(b) by 0 days.

(21) Appl. No.: 12/019,296

(22) Filed: Jan. 24, 2008

(65) Prior Publication Data
US 2008/0114497 A1    May 15, 2008

Related U.S. Application Data

(62) Division of application No. 11/135,054, filed on May 23, 2005, now Pat. No. 7,502,665.

(51) Int. Cl.
*G05D 7/00*    (2006.01)
*G05D 11/00*    (2006.01)

(52) U.S. Cl. .................. 700/283; 700/57; 700/241; 700/281; 239/61; 239/170; 239/528

(58) Field of Classification Search .......... 700/231, 700/241, 280–284, 57; 137/78.2–78.3, 15.12, 137/38; 239/61, 64, 69, 72, 74, 99, 170, 239/172, 176, 290, 528, 538, 71, 73; 73/861.8, 73/865.9, 120, 592; 340/10.1, 10.3, 10.31, 340/10.42
See application file for complete search history.

(56) References Cited

U.S. PATENT DOCUMENTS

| | | | |
|---|---|---|---|
| 4,328,025 A | 5/1982 | Whitcomb | |
| 4,823,268 A | 4/1989 | Giles et al. | |
| 4,905,897 A | 3/1990 | Rogers et al. | |
| 5,004,152 A | 4/1991 | Baker et al. | |
| 5,134,961 A | 8/1992 | Giles et al. | |
| 5,389,781 A | 2/1995 | Beck et al. | |
| 5,442,552 A | 8/1995 | Slaughter et al. | |
| 5,544,813 A | 8/1996 | Giles et al. | |
| 5,653,389 A | 8/1997 | Henderson et al. | |
| 5,704,546 A | 1/1998 | Henderson et al. | |
| 5,763,873 A | 6/1998 | Beck et al. | |

(Continued)

OTHER PUBLICATIONS

Product Data Sheet for AIM Command® Spray System (Case IH), 2 pages.

(Continued)

*Primary Examiner*—Paul L Rodriguez
*Assistant Examiner*—Sheela Rao
(74) *Attorney, Agent, or Firm*—Dority & Manning, PA

(57) ABSTRACT

A networked delivery system and method for controlling operation of a spraying system includes nozzles for emitting an agrochemical according to a predetermined spray pattern and flow rate; vibration sensors located adjacent an agricultural spray system component to sense vibrations of the agricultural spray system component, such as spray nozzles. The networked delivery system also includes a control area network with a computer processor in communication with the vibration sensors. The processor conveys information to an operator regarding the agricultural spray system component based on the sensed vibrations. The processor also actuates each of the agricultural spray system components such as the spray nozzles to selectively control each of the nozzles or a designated group of the nozzles.

15 Claims, 17 Drawing Sheets

U.S. PATENT DOCUMENTS

| | | | |
|---|---|---|---|
| 5,809,440 A | 9/1998 | Beck et al. | |
| 5,833,144 A | 11/1998 | Kinter | |
| 5,841,035 A | 11/1998 | Andoh et al. | |
| 5,861,556 A | 1/1999 | Nukui et al. | |
| 5,881,919 A | 3/1999 | Womac et al. | |
| 5,884,205 A * | 3/1999 | Elmore et al. | 701/50 |
| 5,908,161 A | 6/1999 | Womac et al. | |
| 5,967,066 A | 10/1999 | Giles et al. | |
| 6,003,383 A | 12/1999 | Zielinska et al. | |
| 6,053,053 A | 4/2000 | Huotari | |
| 6,170,338 B1 | 1/2001 | Kleven et al. | |
| 6,230,091 B1 | 5/2001 | McQuinn | |
| 6,260,941 B1 | 7/2001 | Su et al. | |
| 6,596,996 B1 | 7/2003 | Stone et al. | |
| 6,689,338 B2 | 2/2004 | Kotov | |
| 7,311,004 B2 * | 12/2007 | Giles | 73/592 |
| 7,388,464 B2 * | 6/2008 | Ward et al. | 340/3.41 |
| 2005/0000277 A1 * | 1/2005 | Giles | 73/120 |
| 2005/0263611 A1 * | 12/2005 | Gotoh et al. | 239/102.1 |
| 2006/0225489 A1 | 10/2006 | Giles et al. | |

OTHER PUBLICATIONS

Piezo Film Sensors Technical Manual from Measurement Specialties, Inc., Appendices A and B, Apr. 1999, pp. 59-82.

"Sensing Spray Nozzle Vibration as a Means for Monitoring Operation", by D.K. Giles, pp. 1-7, ILASS Americas, 17$^{th}$ Annual Conference on Liquid Atomization and Spray Systems, Arlington, VA.

U.S. Appl. No. 10/786,614, filed Feb. 25, 2004 and entitled "Flow Control and Operation Monitoring System for Individual Spray Nozzles".

* cited by examiner

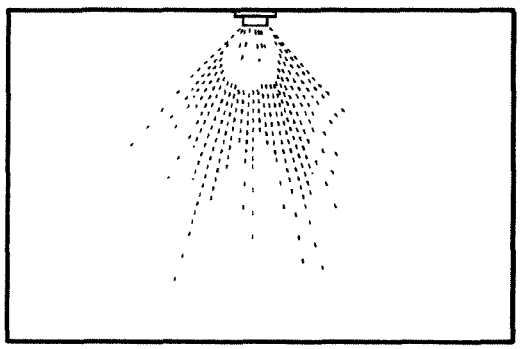
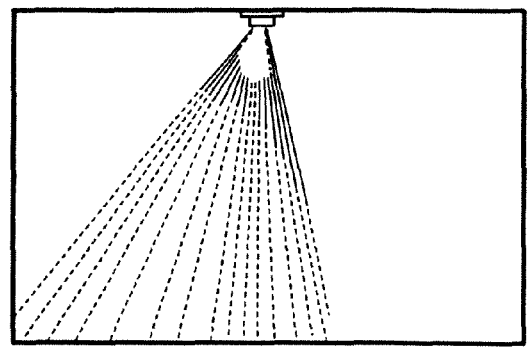
FIG. 5J  FIG. 5K
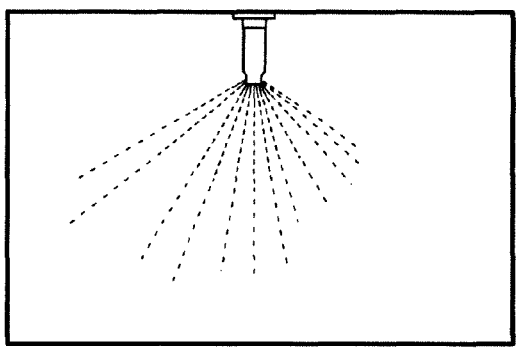
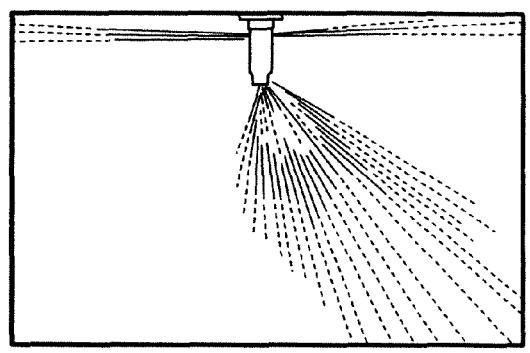
FIG. 5L  FIG. 5M
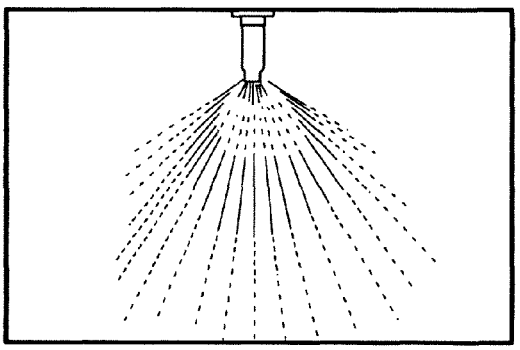
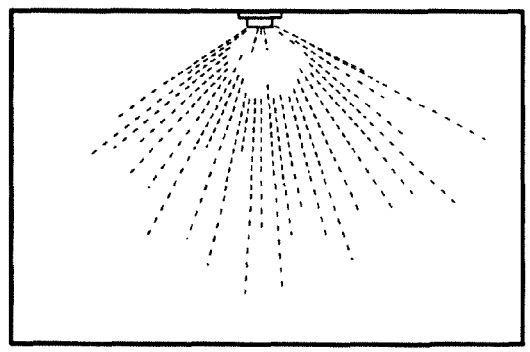
FIG. 5N  FIG. 5O

| Test Number | Nozzle | Action | Average Value |
|---|---|---|---|
| 1 | 11006 | Engine off | 2464 |
| 2 | 11006 | Engine off | 2429 |
| 3 | 11006 | Spray pump on, no spray engine idle | 5186 |
| 4 | 11006 | 90 psi spraying, no clog | 104854 |
| 5 | 11006 | 40 psi spraying, no clog | 35634 |
| 6 | 11006 | Driving, spray off | 3069 |
| 7 | 11006 | Driving, 40 psi spraying | 42017 |
| 8 | 11006 | Stationary vehicle, clogged nozzle, 40 psi | 5829 |
| 9 | 11006 | Driving, clogged nozzle, 40 psi | 6289 |
| 10 | 11006 | Driving, 80 psi spraying | 117311 |

NETWORKED DIAGNOSTIC AND CONTROL SYSTEM FOR DISPENSING APPARATUS

RELATED APPLICATIONS

The present application is a divisional application of U.S. patent application Ser. No. 11/135,054, which was filed in the U.S. Patent Office on May 23, 2005.

BACKGROUND OF THE INVENTION

Most agrochemicals such as crop protection agents and many fertilizers are applied as liquid solutions, suspensions and emulsions that are sprayed onto target fields. Conventional spray technology is well known and generally understood by farmers, equipment manufacturers and extension agents. Agrochemical manufacturers and regulatory officials are becoming increasingly interested in the spray application process since it affects product efficacy and environmental contamination.

Typically, the agrochemical liquid is supplied by powered pumps to simple or complex orifice nozzles that atomize the liquid stream into spray droplets. Nozzles are often selected primarily on the desired range of flow rates needed for the job and secondarily on the range of liquid droplet size spectra and spray distribution patterns they produce. Nozzle technology has been an area of significant development work in recent years. The number of manufacturers of nozzles and the range of nozzle design, e.g., air inclusion nozzles and pre-orifice designs, have increased greatly in the past decade. The general trend has been toward larger droplet sizes as a means of drift reduction.

There are increasing concerns over inefficient agrochemical use, the cost of agrochemicals and inadvertent spray drift or pesticide run-off. Consequently, those skilled in the art have been attempting to improve the quality, precision, accuracy and reliability of application of agrochemicals. This has led to increased use of electronic control systems and GPS-guided operations. Growth in these "precision agriculture" products and strategies has lead to greater demand for "variable rate" technologies and the fluid handling means to alter spray liquid flow rates.

Simultaneously, the agriculture industry and especially the agrochemical application trade are boosting worker and capital productivity by adopting faster application speeds, wider equipment working widths and greater tank capacities. This combination results in greater efficiencies as measured in "acres per worker-day". While precision agriculture and environmental protection often receive attention in the research and development communities and hold promise for the future, it is the productivity and efficiency aspects of application equipment that often drives immediate sales and adoption of new technology.

New sprayer models may have booms of 30 m (approximately 90 ft) widths and allow application at speeds up to 30 km/hr (20 mph) or higher. Faster ground speeds and wider spray booms can lead to application errors that are significant yet unavoidable with existing spray technology. For example, if the sprayer is traversing the edge of a field while scribing about a 100 m radius (actually, a very gentle turn), the outer nozzles are traveling 35% faster than the inner nozzles. At a 50 m radius, the difference in nozzle ground speeds is 85%. With sharp turns, such as at the end of a pass across a field, the inner nozzles will travel backwards, thereby retracing and overdosing previously sprayed areas, while the outer nozzles will significantly accelerate giving their associated land areas sparse coverage of chemical. Unless the flow rate from each nozzle is individually adjusted to compensate for these differences in travel speeds, application errors may occur. Additionally, in other agricultural spraying operations such as applying pesticide to orchard crops, the density of the foliage may vary across the tree being immediately sprayed and the operator may wish to have varying rates of spray discharged from each nozzle. Individual control of each nozzle would allow the spray intensity to be adjusted to the immediate spray target shape.

The current marketplace for application equipment includes GPS-directed rate controllers, which adjust agrochemical dose in response to field maps or prescriptions. Currently, the maximum resolution (smallest area that can get a distinct rate) for most products is limited by the width of the spray boom. Rate controllers usually control the entire boom as a unit and do not allow different boom sections, let alone individual nozzles, to discharge different rates. Increased resolution of agrochemical application and wider spray booms will require more and smaller distinct units of discrete flow rate control. Some increase in spatial resolution of variable rate application can be achieved by individual control of distinct boom sections using existing technology but the systems can involve cumbersome plumbing, wiring and operator interfaces.

A commercial system developed by Oklahoma State University and Ntech Industries (Ukiah, Calif.) applies nitrogen fertilizer using individually-controlled nozzle manifold units spaced 60 cm along a spray boom. On each nozzle manifold, three separate spray nozzles (tips) are controlled by three individual valves. When the proper range of nozzle sizes (1X, 2X, 4X) are installed, the combination of open valves determines the flow rate discharged from the nozzle manifold. A 7:1 discrete turndown ratio in flow rate can be achieved with combinations of the three valves. The system requires three primary actuators for each nozzle manifold when electric valves are used or six actuators when pneumatic valves are used since each pneumatic valve requires an electric valve controlling the pilot air flow. A 30 m spray boom with nozzle manifolds at a spacing of 60 cm requires 150 individual spray nozzles and 300 actuators. Each nozzle manifold unit can be individually addressed through a CAN bus in communication with a fertility sensing system. The droplet size spectrum and droplet velocity spectrum of the emitted spray varies as the application rate is altered; however, spray droplet size is of less importance in fertilizer application than when pesticides are applied.

Many target-sensing spray control systems, such as the Patchen™ spot weed spraying system and similar commercial and research units, allow on/off—but not continuously variable rate—control of individual nozzles. Pulse width modulation, such as available in the Synchro™ and AIM Command™ systems, provide individual nozzle rate control if the electrical control systems are appropriately configured. Individual control of spray nozzles or nozzle assemblies is of growing importance in agrochemical application. As individual control increases, the need for individual flow monitoring will increase since feedback is needed for closed loop control. Even with a linear control strategy, such as the binary control of multiple nozzles or pulse width modulation, confirmation of proper flow is important.

The spray application industry is adopting larger liquid storage tanks on mobile equipment. Larger spray tank capacities result in fewer stops for refilling and greater land areas covered between stops. Assuming a 30-km/hr ground speed, a 30 m boom width and 50 l/ha (approximately 5 gal/acre) application rate, a 4000 l (approximately 1000 gal) tank will cover 200 acres in approximately 1 hour. Since the operator is unlikely to stop the vehicle and leave the cab between refillings, clogged nozzles or other problems on the boom are unlikely to be detected while significant land areas are being treated. In the previous example, a single nozzle would treat approximately 3.5 acres per tank load and a single undetected nozzle malfunction would correspond to this 3.5-acre area receiving an incorrect, or perhaps zero, dose of agrochemical. Additionally, the wider boom widths, travel speeds and vehicle sizes increasingly restrict an operator's view of the boom and the opportunities to view the boom while driving. On modern agricultural spray vehicles, 30 to 50% of the spray boom may not be visible to the operator.

On some larger sprayers such as those typically used by custom applicators in the Midwest, Central Canada and the Plains, video cameras are sometimes mounted on the rear of the sprayer so that the operator can monitor, at least in theory, the spray boom out of his or her line of sight. However, at high travel speeds, the operator's attention is fully devoted to driving instead of monitoring the spray boom in the rear, either in the line of direct sight or shown on the video monitor. Due to poor overall visibility from the operator's station and the infrequency of stops and refillings, there is a need for individual nozzle monitoring to confirm that no clogging, pinched hoses, damaged nozzles or other problems may be present or developing on the spray boom.

A similar problem exists on shielded or shrouded sprayers sometimes used in the North American Plains and in urban and landscape applications. In farming areas in extreme southern and northern latitudes and in high value specialty crops, often grown in coastal areas, the agronomic time window for pesticide applications can be critically short and often occurs during windy periods. Shielded sprayers are often used in these conditions. Similarly, sprayers used in golf course, landscape and other urban conditions commonly use shrouds, curtains or shields to deliberately obstruct the nozzles from view. This is partially to reduce spray drift but also as a concession to public relations. Some golf course and landscape sprayers are even disguised as mowers. The shields prevent the operator from visually inspecting the nozzle spray patterns to confirm proper operation. Improperly operating nozzles are not easily detected. Commercial systems for agricultural use often address this problem by routing individual liquid lines to each nozzle through a small rotameter (ball in tube) flow monitor that is mounted in the operator's line of sight. While effective, this requires cumbersome plumbing for each nozzle, and the operator must visually monitor the bank of tubes.

Relying on visual inspection (either direct line of sight or video) or simple flow measurement (ball-in-tube) does not assure proper nozzle operation. Nozzles can be partially clogged or have an obstruction in the flow path and appear to be operating correctly even if the flow rate is significantly affected. Conversely, the nozzle pattern and spray droplet size can be severely distorted by an obstruction or damage, yet the flow rate remains close to the original value. In this regard, the ball-in-tube monitors are not sensitive enough to detect clogs that could be sufficiently severe enough to require re-treatment of the spray area.

Electronic spray rate control systems and application monitors typically use a single flowmeter and/or pressure transducer for feedback of the flow conditions on the entire spray boom. In systems with many nozzles, such as a 50-60 nozzle boom, failure of 1 or 2 nozzles would be unlikely to raise an alarm since the overall effect is only 2% of the expected flow rate; the system would compensate by maintaining the correct overall flow to the entire boom. So, for example, if one nozzle in a 50-nozzle system became completely clogged, the system would simply increase the spray pressure and force an additional 2% flow through the remaining nozzles. Even with the electronic control or monitor system, the driver would likely remain unaware of the failure.

Additionally, when individual nozzle control is implemented, the need for individual nozzle monitoring increases. Pulse width modulation systems have electrical and mechanical components on each nozzle. Multiple nozzle manifolds have multiple tips and actuators at each boom location. The opportunity for failure is increased over that of a simple nozzle. These systems require not only flow monitoring but also monitoring of the control actuators used for flow or droplet size modulation. Moreover, individual nozzle control implies that individual nozzle feedback is required for closed loop operation.

Future systems may incorporate individual nozzle injection of multiple agrochemicals or adjuvants, individual control of droplet size spectra, droplet velocity or spray distribution. In each case, the need for monitoring and actuation on a single-nozzle or single manifold basis increases.

Thus, a need exists in the industry for a system and process for monitoring spray nozzle operation. In particular, a need exists for a system that is not only capable of monitoring the flow rate of a fluid through a nozzle, but is also capable of monitoring the flow pattern that is emitted from the nozzle. It should be understood, however, that similar needs also exist in other fields. For example, on irrigation systems, there may be many small nozzles, often obscured from view or in areas that are difficult to access. Failure of a nozzle might not be detected until drought damage to a plant had occurred and symptoms were visible. Likewise, in industrial spray driers, malfunction of a nozzle might not be detected until significant amounts of product have been damaged. In spray humidification or cooling systems, nozzle failures might not be detected until excessive heating or drying had occurred. Specifically, a system that monitors nozzle operation may find wide applicability in any system, whether commercial, industrial or residential, that utilizes spray nozzles.

SUMMARY OF THE INVENTION

In general, the present invention is directed to a networked system and process for monitoring and controlling the operation of dispensing systems and their individual components including pumping devices, filters, flow control valves, spray nozzles, mixing devices and various sensors. The present invention is suitable for use with any of various types of spraying systems and in various and many application systems. For example, the system of the present invention can be used in conjunction with agricultural spray systems that are designed to apply liquids or powders to a field. Alternatively, the present invention can be used in irrigation systems to ensure that each nozzle in the system is working properly. In addition to the above, it should be understood that the system of the present invention can be used to monitor and control sprayer components in any industrial process, commercial process, or residential process.

The component parts of the system are simple and economical to manufacture, assemble and use. Other advantages of the invention will be apparent from the following description and the attached drawings, or can be learned through practice of the invention.

In one embodiment of the present invention, a networked delivery system includes a communication network to establish operative communication between individual device nodes and a central operator interface. The networked delivery system in this aspect includes a plurality of nozzles that emit an agrochemical according to a predetermined spray pattern and application rate. A plurality of vibration sensors are located adjacent respective nozzles, either in direct contact with the nozzles or sufficiently close to sense nozzle vibrations in at least one direction. The communication network or control area network of the networked delivery system includes at least one processor in communication with the vibration sensors. The processor can be a microprocessor or a programmable logic controller that serves to actuate each of the nozzles and to selectively control each of the nozzles or a designated group of the nozzles. The processor conveys information through the control area network regarding the nozzles based on vibrations sensed by the vibration sensors. An operator, typically in a cab of a tractor of the networked delivery system, can monitor and control the nozzles via the control area network.

Also in this aspect of the invention, the network delivery system can include an operator interface, which has an interactive display or graphical user interface that allows the operator to provide configuration information for the networked delivery system. The operator interface can be loaded with a programmable map, which the operator can use to selectively enable, disable and control each of the nozzles or a designated group of nozzles. Moreover, the programmable map can be used to set up "soft" booms of nozzles such that the designated group of nozzles is activated only on that portion of the boom designated as the "soft" boom. The operator interface is used by the operator to monitor each nozzle or other agricultural system components such as spray nozzles, inline mixing devices, liquid filters, flow control valves, liquid pumps, tank level sensors, fluid pressure transducers, temperature sensors or other physical or chemical sensors. For instance, the nozzles can be monitored for irregularities in spray atomization, spray pattern and flow rate of the agrochemical.

At least one of the nozzles in this aspect of the invention can be a pulsating nozzle. For instance, the networked delivery system can include a valve such as a solenoid valve, which is manipulated by a controllable processor to pulse the nozzle at a desired frequency and duty cycle. Each nozzle of the network delivery system also defines a Z-axis, which corresponds to a direction of flow of fluid through the nozzle. The nozzle can also include an X-axis that is perpendicular to the Z-axis and extends left and right of the nozzle when facing a front of the nozzle. A Y-axis of the nozzle is perpendicular to the Z-axis and to the X-axis. The respective vibration sensor introduced above senses vibrations in at least one of the Z-axis direction, the X-axis direction or the Y-axis direction. At least one of the vibration sensors may also sense vibrations in the Z-axis direction to convey information to the operator regarding a flow rate of a fluid being emitted by the respective nozzle. One of the vibration sensors can also sense the vibrations in the Y-axis direction to convey information to the operator regarding fluid emission and spray atomization by the respective nozzle.

In this aspect of the invention, the vibration sensor can be an accelerometer or a piezoelectric device. Such vibration sensors according to the invention will sense vibrations at a frequency of from about 500 Hertz to about 10,000 Hertz.

Also in this aspect of the invention, the control area network can include a plurality of processors or microprocessors. Stated another way, one processor can be used to control and monitor all nozzles, a group of nozzles or an individual nozzle. Additionally, other agricultural system components can be monitored and controlled by the processor or respective processors or microprocessors.

The control area network can include a network bus to conduct a plurality of signals to and from the processor. The network bus can include a communication cable and a power cable. The communication cable is used to conduct the signals and the power cable is used to supply power to the control area network. The signals, which are conducted on the communication cable, can be actuation signals, monitoring signals, control signals and combinations of these and other signals.

Also in this aspect in this invention, the control area network can include an alarm that is activated when vibration information received by the processor from any one of the vibration sensors is outside of preset limits. The alarm can be a visual alarm, an audible alarm or other sensory alarms as well as combinations of these alarms. For instance, the visual alarm can be located on or near the operator interface in the form of colored lights. Moreover, a visual alarm can be located in the form of an LED on or near the nozzle itself.

In one embodiment, a communication network is used to establish operative communication between individual device nodes and a central operator interface. In this aspect of the invention, the operator interface includes a microprocessor, a data input device and a display. The data input device allows the operator to provide configuration information for the system; the display provides system information back to the operator.

In another embodiment of the invention, a networked system for controlling and monitoring the operation of a fluid nozzle can include a fluid nozzle for emitting a fluid according to a predetermined spray pattern and flow rate. An electrical solenoid valve can be positioned in operative association with the nozzle to provide a pulse-width-modulated flow of a liquid through the nozzle. A vibration sensor can be positioned in operative association with the fluid nozzle. The vibration sensor senses fluid vibration produced by the nozzle in at least one direction as the fluid nozzle is operating.

In this aspect of the invention, an electronic controller is placed in communication with the solenoid valve and the vibration sensor. The controller receives a desired operating condition for the valve and actuates the valve in accordance with the desired condition. The controller also receives information from the vibration sensor and indicates whether the solenoid valve and the fluid nozzle are operating correctly based on the vibrations sensed. For instance, the controller can indicate whether or not the fluid nozzle is emitting a proper spray pattern and/or whether the fluid nozzle is operating at the correct flow rate. The controller can indicate whether the solenoid valve is opening and closing in accordance with the desired operating conditions. For instance, the system can determine whether the fluid nozzle is clogged or simply needs adjustment. In one aspect, the controller can be configured to compare a reference, standard or ideal vibration output to a vibration output received from the vibration sensor. From this comparison, the controller can indicate an irregularity in the operation of the fluid nozzle.

The vibration output that is compared to the actual vibration output received from the vibration sensor can vary depending upon the particular application. For instance, in one aspect of the invention, the reference vibration output can include a vibration output received from a second fluid nozzle or from an average of all nozzles. Still further, the reference vibration output may be received from the same fluid nozzle that is being monitored. For instance, the reference vibration output of the fluid nozzle that is being monitored can be recorded during initial start up and used later to compare subsequent vibrations to that initial reference vibration output.

Also in this aspect, the controller can include a display that visually displays information received from the vibration sensor for determining whether the spray pattern of the nozzle is operating properly. The controller can be, for instance, one or more microprocessors such as any type of suitable programmable logic unit or controller. The vibration sensor can also be an accelerometer such as a solid-state accelerometer. Moreover, the vibration sensor can be a piezoelectric device, a microphone, or a sonophone in contact with the liquid supply to the nozzle.

In a further aspect of the invention, the relationship between the physical location of the nozzle mode on the spray boom and the electronic address must be known in order to control or monitor individual nozzles based on their location. Thus, the vibration sensor is used to sense the impact of a "rap" or sharp impact on the nozzle to set up the nozzle locations on the spray boom. A visual indicator (e.g. an LED) can be used to show the operator when the rap on the nozzle is successful to claim the boom location on the control area network bus system. Further, the visual indicator will help the operator locate a particular nozzle when a problem is indicated on the operator interface. Thus, the operator will not have to remember a number displayed on the operator interface associated with a particular nozzle when he turns off the spray and exits the cab to look for the nozzle. Since the nozzle is not spraying, the operator can simply look for the LED to indicate the problematic nozzle.

In a further embodiment of the invention, a networked delivery system for controlling operation of a spraying system is provided, which includes a plurality of nozzles configured to emit an agrochemical according to a predetermined spray pattern and application rate. A plurality of vibration sensors are also included with at least one of the vibration sensors disposed adjacent an agricultural spray system component and at least one other of the vibration sensors disposed adjacent a respective nozzle. The vibration sensors, similar to the foregoing embodiments, sense vibrations of the agricultural spray system component and the nozzle.

The agricultural system component, in addition to being a spray nozzle, can be an inline mixing device, a liquid filter, flow control valves, liquid pumps, tank level sensors, fluid pressure transducers, temperature sensors and other physical or chemical sensors. Specifically, vibration sensing can be used to detect clogged filters or pumps that are running "dry". These problems can be detected due to a change in their frequency of vibration.

The networked delivery system in this aspect of the invention also includes a control area network having at least one processor in communication with the vibration sensors. As above, the processor conveys information to an operator regarding the agricultural spray system component and the nozzle based on vibrations sensed by the vibration sensors. The processor can also be used to actuate each of the nozzles and to selectively control each of the nozzles or a designated group of the nozzles via an operator interface substantially as described above.

In a further embodiment of the invention, a hand-held vibrator can be used in place of "rapping" or tapping on a nozzle location to set up the nozzle within the control area network. For instance, a hand-held vibrator, which produces vibrations of a programmable frequency, can be used by touching the vibrator to the nozzle node, which indicates to the system via the distinct frequency the type of nozzle node involved. For example, a 1000 Hz vibration can indicate a 0.5-gallon/minute nozzle and a 2000 Hz vibration can indicate a 1.0-gallon/minute nozzle. Accordingly, locations of the nozzle modes are transmitted when the node is touched by the vibrator but additionally allows the system to detect the type of nozzle by sensing the predominate frequency during the registration event.

In a further embodiment of the invention, a process for operating a networked spraying system includes the steps of sensing vibrations occurring at a plurality of agricultural spray system components interfaced in a control area network; communicating the sensed vibrations to an operator interface via the control area network; and comparing the sensed vibrations to a reference for determining whether the agricultural spray system components are operating properly.

In this aspect of the invention, at least one of the agricultural spray system components is a fluid nozzle in which at least one of the sensed vibrations occurring is related to fluid being emitted from the fluid nozzle. Other agricultural spray system components in this aspect, as noted above, can be a filter, a pump or the like. Also similar to the above embodiments, in this process the sensed vibrations will indicate any irregularities in spray atomization or a spray pattern being emitted by the fluid nozzle. In one aspect, the fluid being emitted by the fluid nozzle emits at a flow rate of from about 0.05 gallons/minute to about 1.5 gallons/minute. The associated vibration is sensed in at least one direction, which may include a Z-axis direction for monitoring flow rate variations as the fluid is emitted from the fluid nozzle and the Y-axis direction for monitoring any variations in a spray pattern or droplet-size spectrum being emitted by the fluid nozzle. The vibrations can be sensed by a solid-state accelerometer housed in a nozzle node module or attached on or near an exterior surface of a nozzle. The vibrations sensed by the accelerometer can range in frequency from about 500 Hz to about 10,000 Hz.

In yet another embodiment of the invention, a method of actuating and controlling a network spraying system includes the steps of a providing a plurality of nozzles spaced apart from each other in which each nozzle emits an agrochemical according to a predetermined spray pattern and application rate; attaching a plurality of vibration sensors adjacent respective nozzles; and registering the nozzles in a control area network to selectively monitor and control each of the nozzles or a designated group of nozzles. As noted above, the designated group of nozzles can be arranged in a "soft" boom via a programmable map loaded in an operator interface.

According to the method, the step of registering the nozzles can be accomplished by tapping on or near each of the vibration sensors, which will cause the associated processor to equate the tapping with a respective electronic registration of the nozzle in converting the electronic registration to the respective spray boom location in the operator interface. Alternatively, the step of registering the nozzles can be accomplished by placing a vibrator on or near each of the vibration sensors. The vibrator in this aspect will vibrate at a pre-selected frequency to activate the respective electronic registration of the respective nozzle. The processor will associate the pre-selected frequency with the respective nozzle and convert the respective electronic registration to the respective spray boom location in the operator interface.

The method can also include the step of providing respective indicators such as LED's associated with each nozzle. Each LED will indicate registration of the respective nozzle in the control area network to the operator as he taps or vibrates the vibration sensors and the nozzle during initial set-up. As above, the indicator will also indicate a nozzle problem to the operator during operation of the system.

Also according to the method, the step of controlling a spray pattern atomization of the agrochemical or application rate from the nozzles can be accomplished as the network spraying system turns through a radius to ensure appropriate crop coverage; e.g., the center nozzles can be programmed to reduce their flow rate as they traverse a smaller ground area more slowly relative to outer nozzles, which traverse more ground area faster, requiring an increased flow rate from the outer nozzles. In this manner, the application rate, defined as the volume of liquid deposited per unit of land area (in gallons per acre or liters per hectare) is maintained at a constant desired rate even though the rate of land (acres per minute or hectares per minute) being sprayed per nozzle varies across the spray boom.

In yet a further embodiment of the invention, a method of controlling the application rate of a networked spraying system includes the steps of registering a plurality of agricultural spray system components in a control area network to selectively monitor and control each of the components or a selected group of the components; assessing a plurality of waveforms of respective agricultural spray system components, such as spray nozzles, to baseline respective vibration signatures; and monitoring the waveforms to control application rate of an agrochemical to provide uniform agrochemical application to a crop. The agricultural spray system components can be spray nozzles, flow control valves, pumps or the like for dispensing any powdered or liquid agricultural product.

According to the method, at least one of the waveforms can be a vibration signal. Thus, the method can include the steps of tapping a plurality of vibration sensors directly or in close proximity where each sensor is located near a respective nozzle. A processor is used to associate the tapping to respective electronic addresses of the nozzles and for converting each electronic address to a respective spray boom location to register the nozzles.

The method can also include placing a vibrator near or against the vibration sensors. The vibrator vibrates at a preselected frequency to activate a respective electronic address of each nozzle, and the processor associates the vibration to each electronic address and converts each electronic address to a respective spray boom location to register the nozzles.

In this aspect, the method also includes the step of adjusting respective application rates of each nozzle to compensate for a vehicle turn rate or a speed variation such that an agrochemical is applied evenly to a crop.

The method can include the step of determining if the vibration signal indicates a low system pressure using a pressure transducer disposed in the control area network.

In another aspect of the invention, a method for controlling the application rate of a networked agricultural dispensing system is provided. The method includes the steps of registering a plurality of dispensing system components in a control area network; collecting a plurality of baseline waveforms of respective dispensing system components; and monitoring the waveforms to control application of an agrochemical to provide uniform agrochemical application to a crop.

According to the method, the agricultural dispensing system components are registered in the control area network using a processor configured to associate respective electronic addresses of the agricultural dispensing system components with respective physical addresses. At least one of the agricultural dispensing system components is a nozzle. An output from the nozzle is controlled as the networked dispensing system maneuvers about the crop. Specifically, means for controlling the output such as an algorithm for controlling application rate in a turn can be programmed in the control area network and used with any type of controller that can manipulate, for example, individual solenoid valves. For instance, the means for controlling is a program loaded in the control area network to control a spray pattern, an atomization or a flow rate output. The program controls the spray pattern, the atomization or the flow rate in turns or during speed changes.

BRIEF DESCRIPTION OF THE DRAWINGS

Further aspects and advantages of the invention will be apparent from the following description, or can be learned through practice of the invention, in combination with the drawings in which.

DETAILED DESCRIPTION OF THE INVENTION

Figure 1:
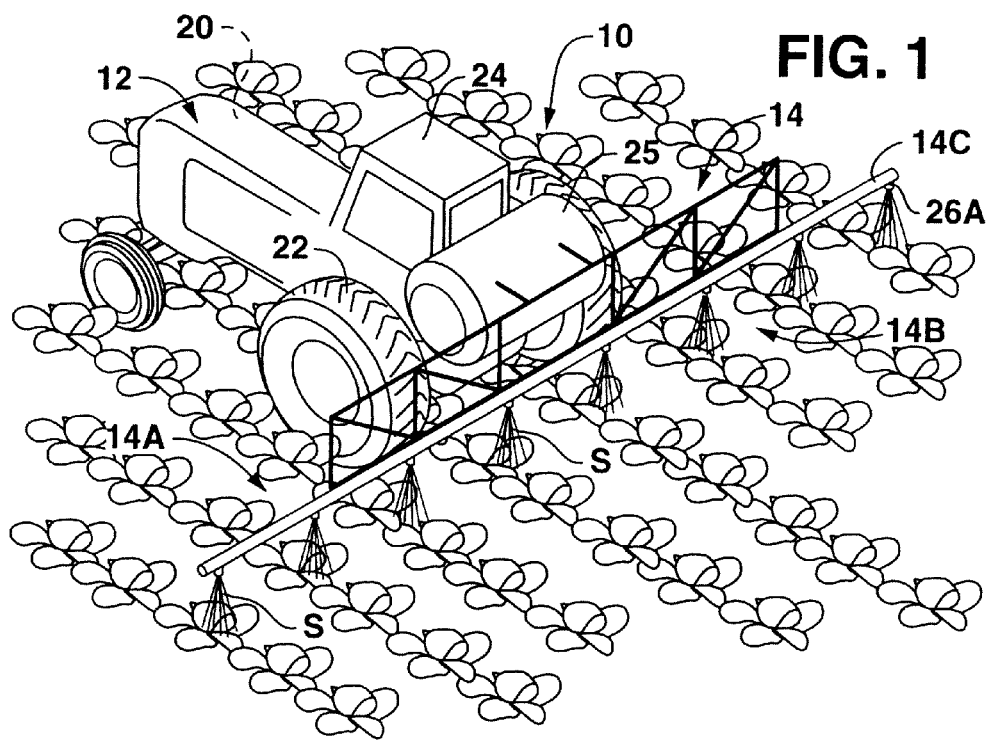
FIG. 1 is a perspective view of an embodiment of an agrochemical dispensing system that may incorporate the teachings of the present invention.

Detailed reference will now be made to the drawings in which examples embodying the present invention are shown. The detailed description uses numerical and letter designations to refer to features of the drawings. Like or similar designations of the drawings and description have been used to refer to like or similar parts of the invention.

The drawings and detailed description provide a full and written description of the invention, and of the manner and process of making and using it, so as to enable one skilled in the pertinent art to make and use it, as well as the best mode of carrying out the invention. However, the examples set forth in the drawings and detailed description are provided by way of explanation only and are not meant as limitations of the invention. The present invention thus includes any modifications and variations of the following examples as come within the scope of the appended claims and their equivalents.

In general, the present invention is directed to a networked system and process for monitoring the operation of numerous agricultural components such as spray nozzles, pumps, filters and the like. More particularly, in one embodiment, the present invention is directed to using multiple vibration sensors, such as accelerometers, networked in a control area network to sense and measure the vibrations produced by the spray nozzles or other agricultural components. Through the sensed vibrations, information regarding the performance of the agricultural components can be obtained and displayed on an operator interface such as a graphical user interface. Moreover, the operator interface can be used to control operation of the agricultural components. For instance, through the present invention, information can be gathered regarding the spray pattern of a nozzle and/or the flow rate of the nozzle.

In another aspect of the invention, the vibrations sensed from the nozzle can be compared to the typical vibration signature of a properly operating nozzle for determining whether the nozzle is operating properly. In yet a further aspect, the nozzle can be turned on or off or its spray rate or pattern adjusted. Still further, the vibrations sensed from a pump or filter can be compared to the typical vibration signature of a properly operating a pump or filter for determining whether the pump or filter is operating properly. Thus, as will be described in more detail below, the present invention provides a sensitive, low-cost, reliable and rugged, networked, signal conditioning and component control system.

The figures generally show a networked spraying system 10 including a spray boom 14 with a plurality of nozzle nodes 16. The nozzle nodes 16 are interfaced via a control area network (CAN), which includes an operator interface (OI) 18 for monitoring and controlling the nozzle nodes 16, as well as associated agricultural spray components, which are described in detail below.

As shown in FIG. 1, the networked agricultural spraying system 10 includes a tractor 12 to which the spray boom 14 is mounted for treating agricultural fields with an agrochemical or spray S. The tractor 12 includes an engine 20 and tires 22 to provide locomotion and a cab 24 in which an operator operates the system 10. An agrochemical tank or reservoir 25 is mounted on the tractor 12 in liquid communication with the boom 14. As shown, the boom 14 includes a left boom section 14a and a right boom section 14b with a manifold or tube 14c running along the left boom section 14a and the right boom section 14b. As will be described in greater detail below, the physical boom sections 14a, b can, but not necessarily, correspond to "soft" booms, which are set-up using a programmable map loaded in the OI 18.

Figure 2:
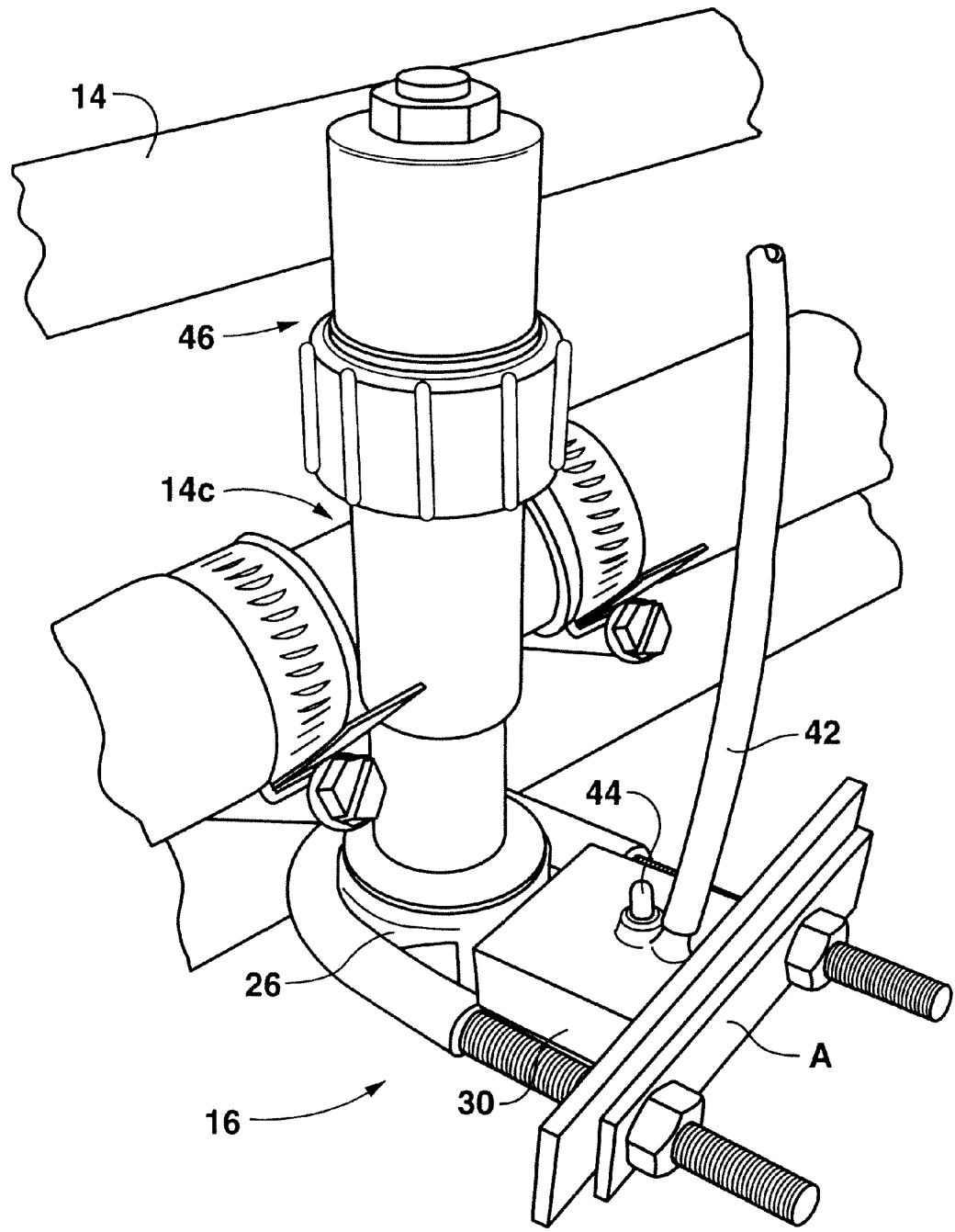
FIG. 2 is a perspective view of a nozzle node employed in the agrochemical dispensing system of FIG. 1 in accordance with an aspect of the present invention.

As shown in FIGS. 1 and 2, a plurality of nozzles 26a are spaced apart from each other on the manifold 14c for spraying the agrochemical spray S on a crop. FIG. 2 most clearly shows the nozzle node 16, which includes a nozzle assembly 26 and an enclosure or module 30. The module 30 is mechanically coupled in this example to the nozzle assembly 26 by an attachment device A. Those skilled in the art will instantly recognize that the module 30 can be attached to or near the nozzle assembly 26 in a variety of suitable ways. Alternatively, the module 30 can be manufactured with the nozzle assembly 26 as a single unit without requiring the attachment device A.

FIG. 2 shows the tube 14c, which is connected to the tank 25 to supply the agrochemical for emission from the nozzle 26a. Also shown, the nozzle assembly 26 is connected to a valve, such as solenoid valve 46, which can be used to open, close, pulse or otherwise control the nozzle 26a. The module 30 is connected in the CAN bus harness via a node CAN cable 42, which permits the OI 18 to control the module 30 and the valve 46.

FIG. 2 further shows an LED 44 located on or near the module 30.

The LED 44 is used to indicate to an operator registration of the nozzle node 16 in the OI 18 as well as to indicate a problem associated with that particular nozzle 26a. Use and operation of the LED 44 is described in further detail below.

Figure 3A:
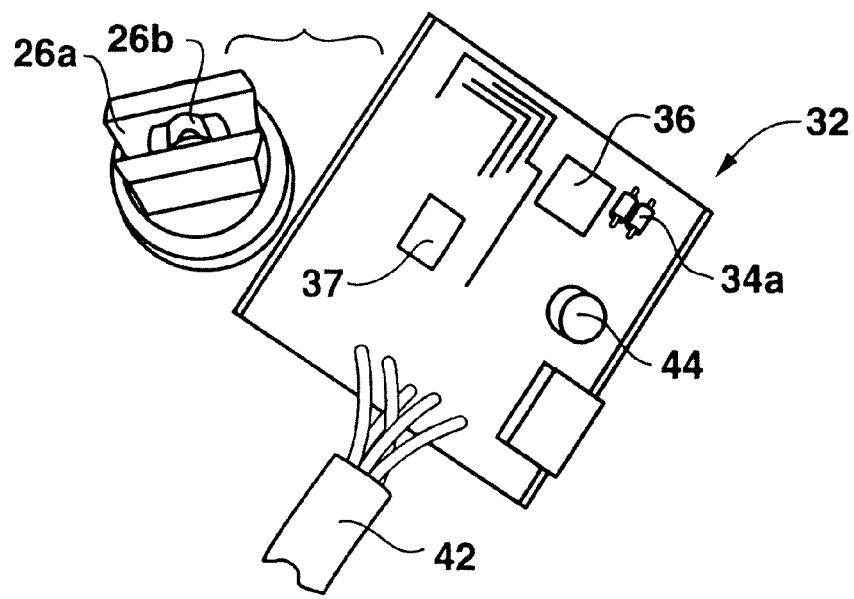
FIGS. 3A and 3B are perspective views of opposing sides of a circuit board as used in the nozzle node of FIG. 2.
Figure 3B:
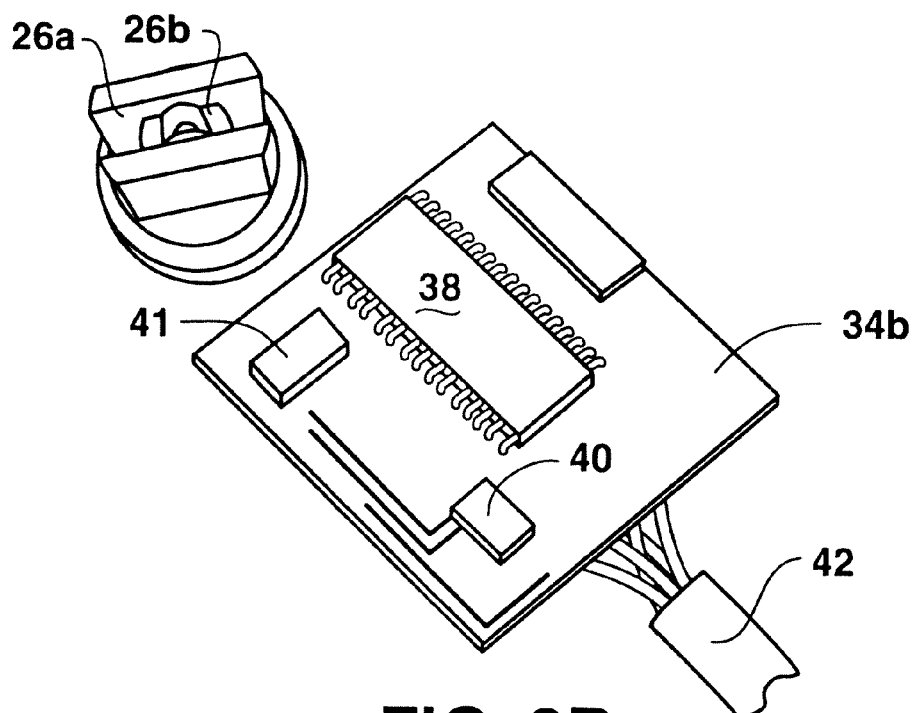

Turning now to FIGS. 3a and 3b, the networked system in one aspect of the invention is based on a solenoid control and nozzle monitor unit or circuit board 32. Specifically, the circuit board 32 is an integrated control and monitoring system having an operational frequency range of 0 to 15 Hz and 0% to 100% duty cycle range for valve actuation. The circuit board 32 includes an analog circuit board side 34a and a digital circuit board side 34b as shown in FIGS. 3a and 3b, respectively. The analog side 34a includes the accelerometer 36 with an amplification and filtering circuit 37, while the digital side 34b includes a CAN bus interface 40, a solenoid controlling transistor 41, and the microcontroller 38. As shown, the circuit board 32 is approximately one square inch (1"). To provide perspective, one of the nozzles 26a including its spray orifice 26b is shown next to the circuit board 32.

Figure 4A:
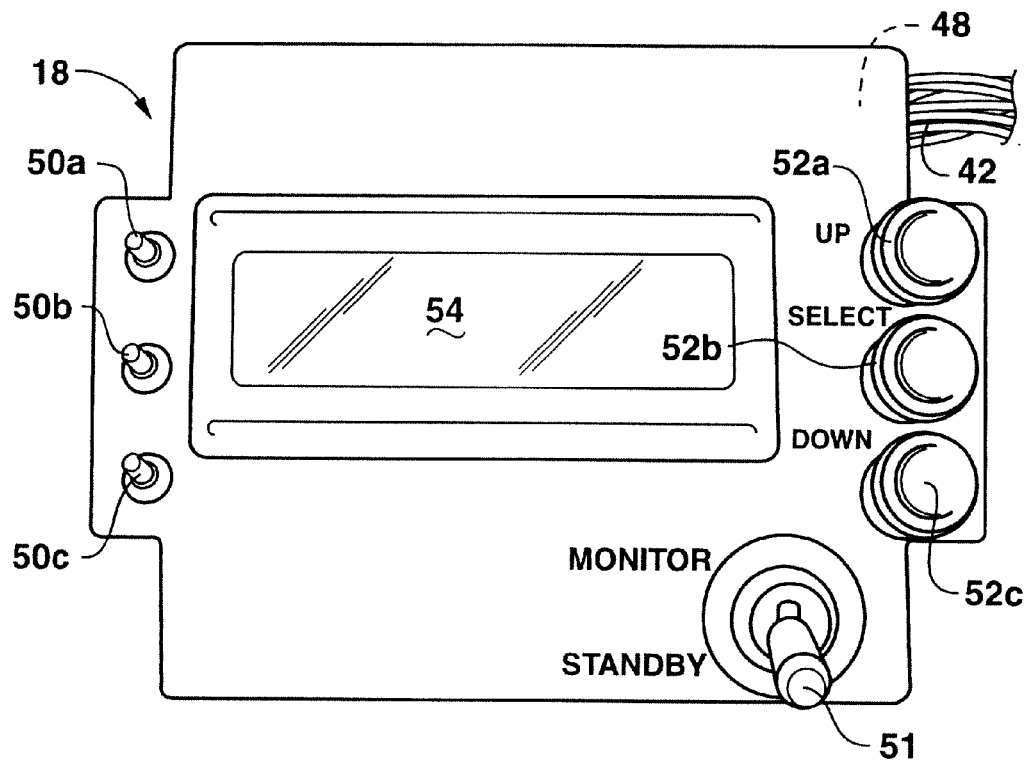
FIG. 4A is a front elevational view of an operational interface employed in the agrochemical dispensing system as in FIG. 1 in accordance with another aspect of the present invention.
Figure 4B:
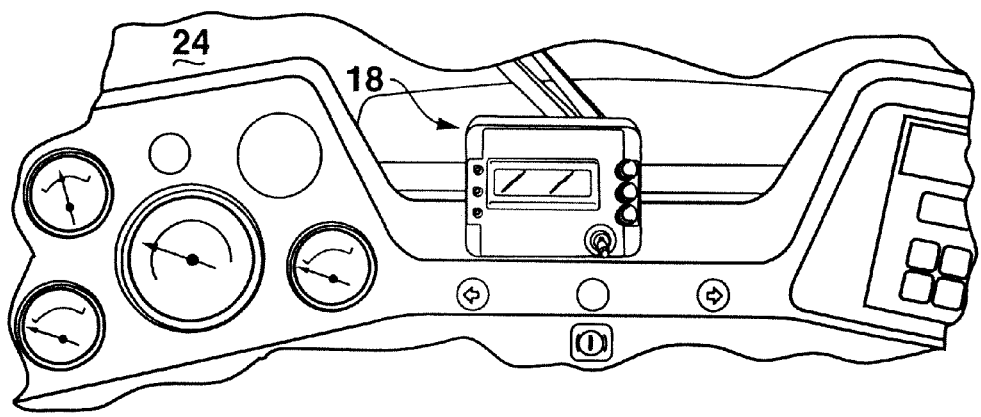
FIG. 4B is a perspective view of the operational interface of FIG. 4A installed in a cab of the agrochemical dispensing system.

FIGS. 4a and 4b show the operator interface (OI) 18, which is installed in the cab 24. The OI 18 includes a series of status lights 50a, 50b and 50c, which respectively indicate a component failure, a warning and an okay status. These lights 50a-c may be respectively red, yellow and green lights, which serve as visual indicators of problems with components of the system 10. An audible alarm (not shown) may be electronically coupled with the lights 50a-c to provide an additional form of alarm to the operator. Moreover, other alarms sensors such as vibratory sensors can be connected to the operational interface OI 18 to further direct the operator's attention to a potential problem.

Figure 5A:
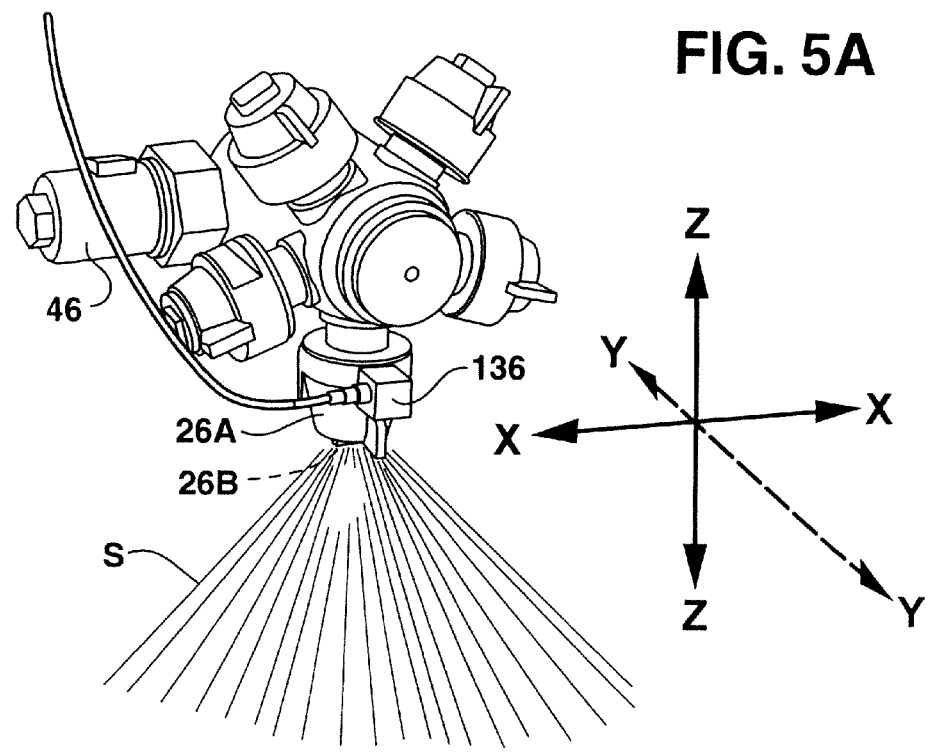
FIG. 5A is a perspective view of a fluid nozzle assembly as used in the nozzle node of FIG. 2 in accordance with an aspect of the present invention.
Figure 5B:
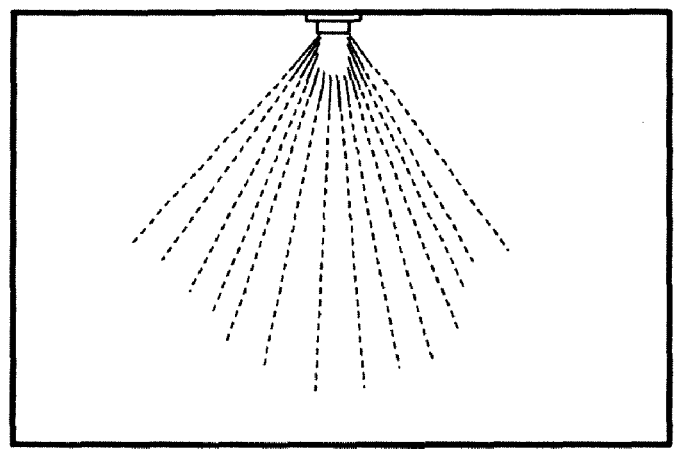
FIGS. 5B through 5Q show various spray patterns and shapes that can be produced by nozzles operating properly and nozzles operating improperly due to partial clogs within their nozzle chambers.
Figure 5C:
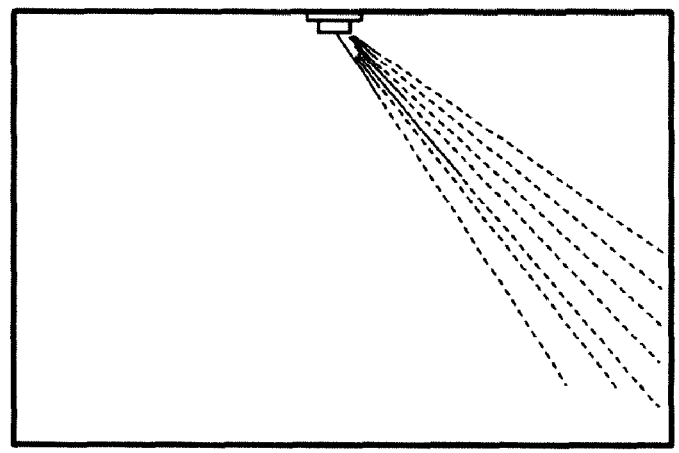
Figure 5D:
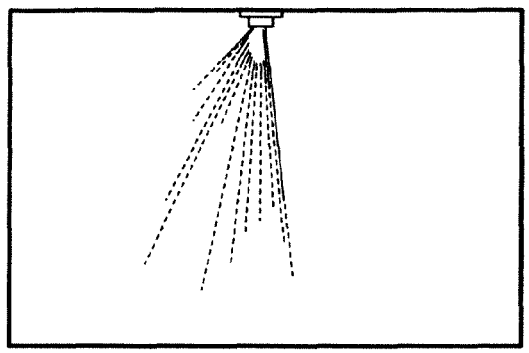
Figure 5E:
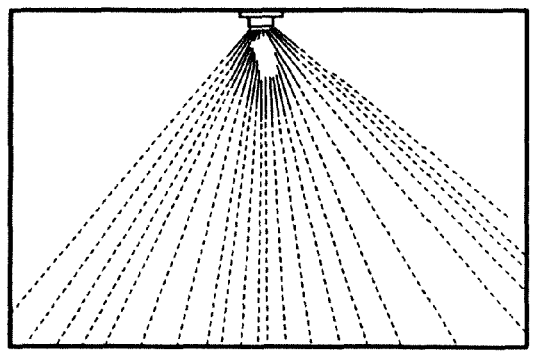
Figure 5F:
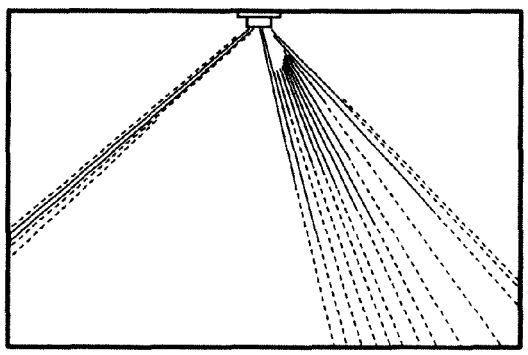
Figure 5G:
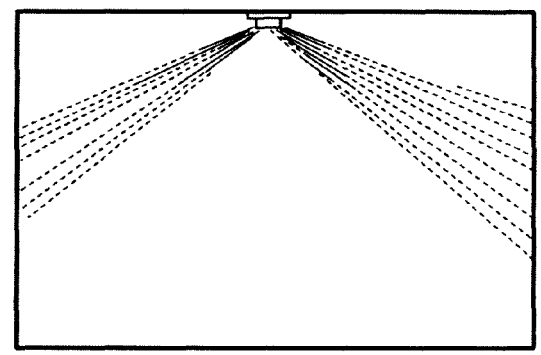
Figure 5H:
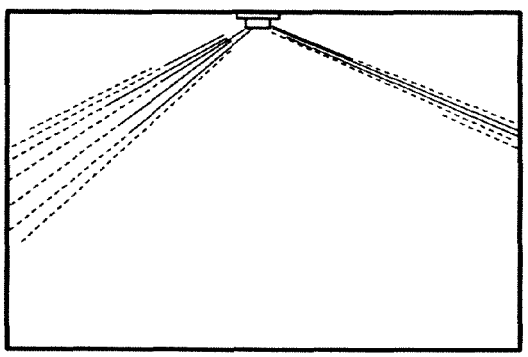
Figure 5I:
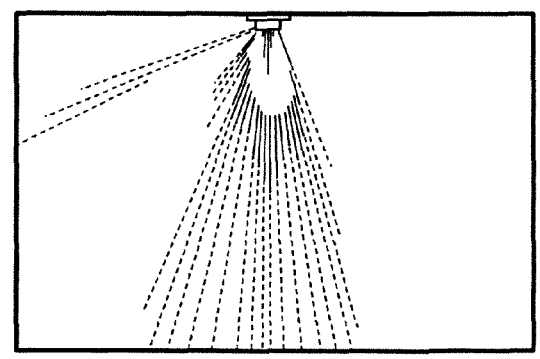
Figure 5P:
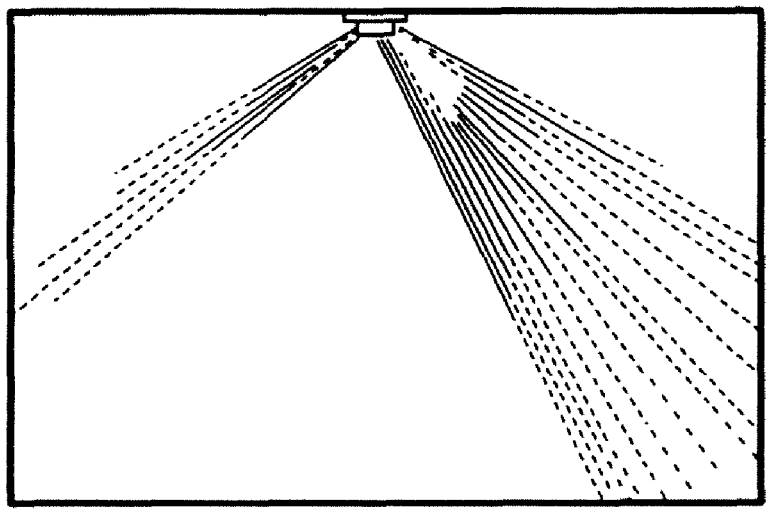
Figure 5Q:
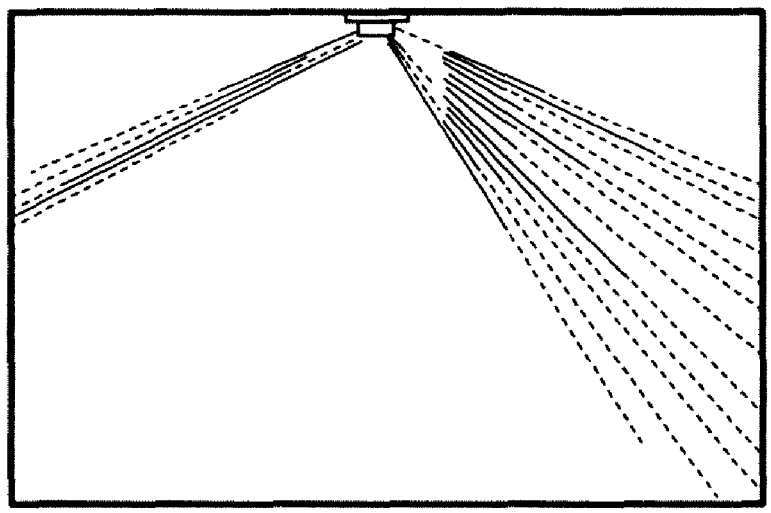

The OI 18 permits the operator to input parameters using a series of controls, in this example push buttons 52a, 52b and 52c. For instance, the push buttons 52a-c allow the operator to navigate a programmable map (not shown) that is loaded as software in the operational interface to provide means to control the various components of the system 10. Specifically, the push buttons 52a-c permit the operator to move up and down the programmable map to manipulate the various components of the system 10 such as to turn individual nozzles 26a on or off or to change their flow rate. For instance, the operator can change a spray pattern of the individual nozzles such as shown in FIGS. 5a-5q in which the nozzle spray output is altered to accommodate the nozzle 26a position on the boom 14 as well as to accommodate the type of agrochemical being applied. Moreover, the OI 18 permits the operator to set up the "soft" booms, such as by activating only boom section 14a as briefly introduced above with respect to FIG. 1. Also noted above, other soft booms can be set up; for instance, by turning on only every other nozzle 26a. Those skilled in the art will instantly appreciate that an almost endless variety of permutations of soft booms can be set up using the OI 18 and its programmable map.

Figure 6A:
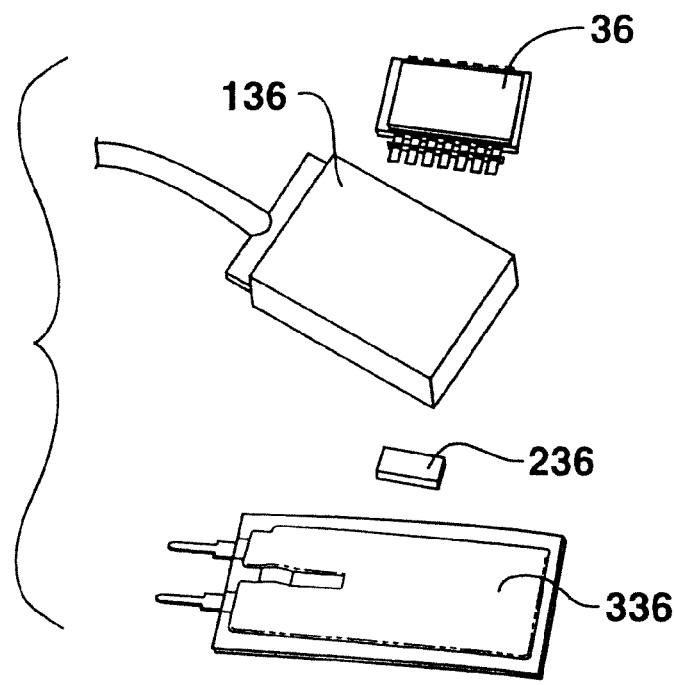
FIGS. 6A and 6B show various vibration sensors that may be used in the nozzle node of FIG. 2.
Figure 6B:
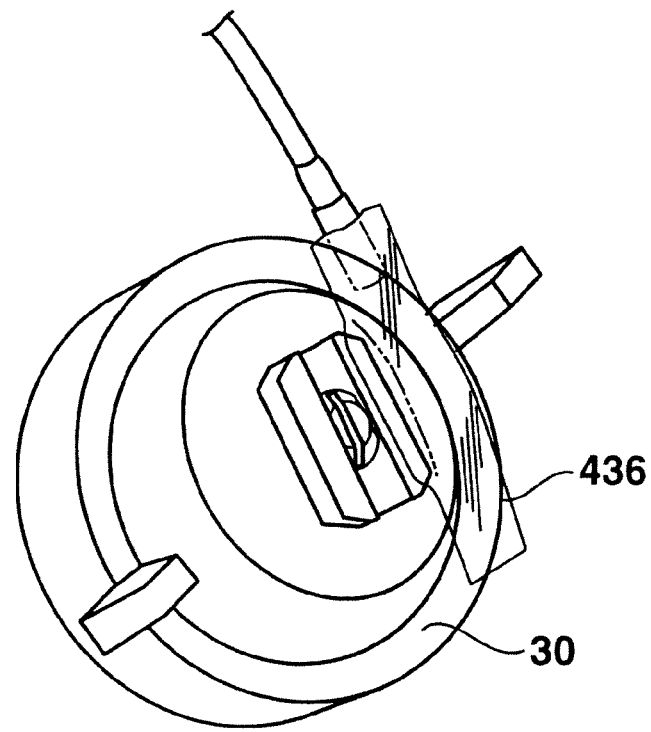

As noted above, the nozzle sensor 36 can be based on a micro electrical-mechanical device including an Analog Devices, Inc. ADXL series accelerometer. As shown in FIGS. 5*a*, 6*a* and 6*b*, the system 10 can utilize alternative forms of vibration sensors such as an externally mounted accelerometer or PLC 136, a piezoelectric device 236, or a PC board (surface or through hole) mount accelerometer 36 or piezofilm 336. In FIG. 6*b*, for instance, an alternative vibration sensor 436 is shown attached to a nozzle assembly 426. In this example, the vibration sensor 436 can be a sonophone in physical contact with the liquid being dispensed to the nozzle.

The invention may be better understood with reference to an operation and testing of the system 10. Testing setup can be divided into five general areas: sensor location setup, soft boom setup, solenoid control, nozzle monitoring, and system error detection.

Location Setup

Figure 14:
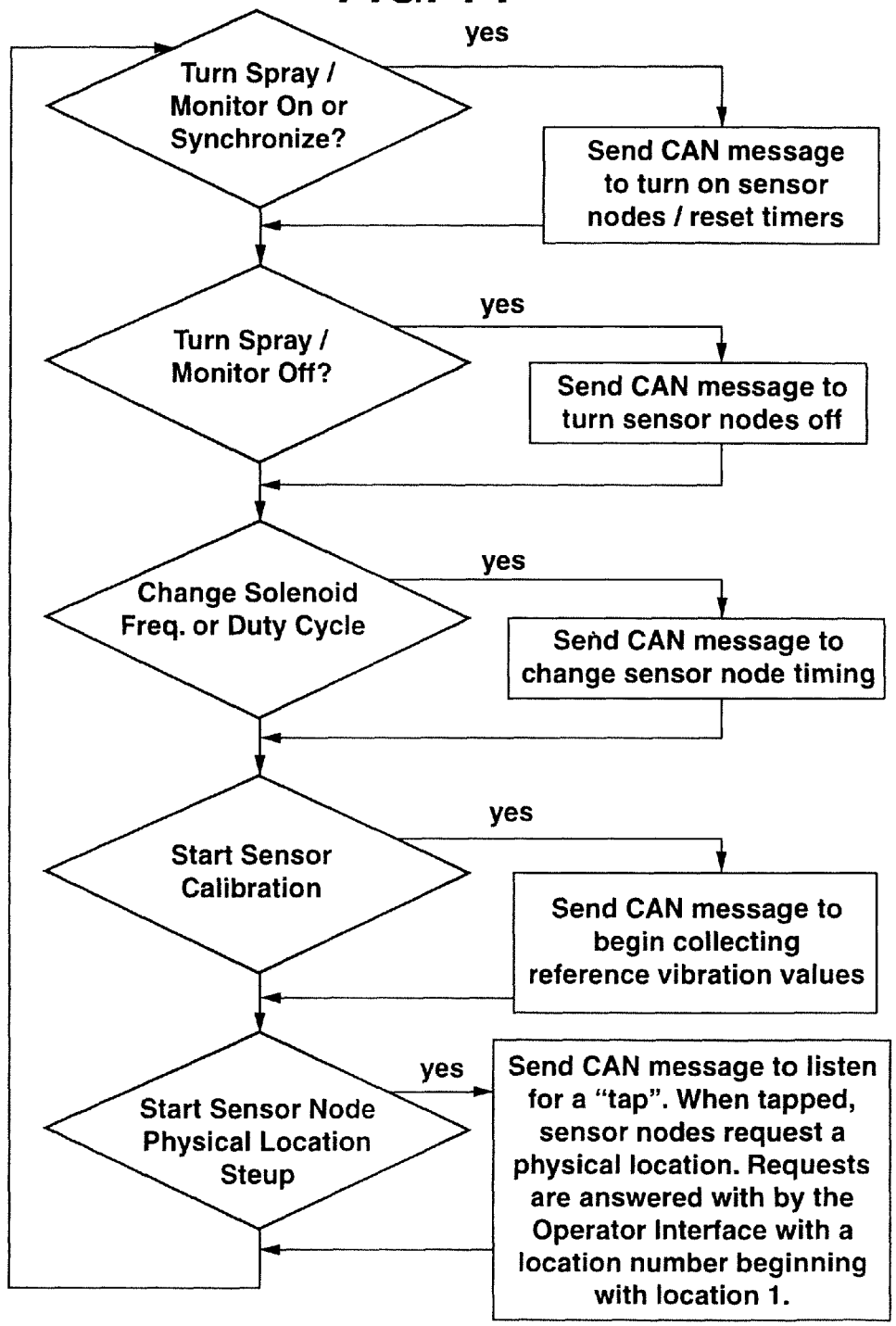
FIG. 14 is a flow chart of control instructions being executed in the operational interface as in FIG. 4A in accordance with a further aspect of the present invention.

When initially installed on the system 10, each nozzle module 30 is automatically assigned a unique electronic network address but the physical location of each sensor 36 is not known to the system 10. The nozzle sensor locations are initialized through a physical registration process. To begin this process, as shown in FIGS. 1, 2 and 14, the operator enters a "location setup" mode in the programmable map menus on the OI 18. In this mode, each nozzle sensor 36 is triggered to detect an impact or a vibration. Specifically, the operator walks along the spray boom 14 from left 14*a* to right 14*b* and taps each module or nozzle sensor 36 in order along the boom 14. When tapped, the nozzle sensor 36 initiates the microprocessor 38 to sends a request to the OI 18 for a location number. The OI 18 responds by sending the next available nozzle location number (beginning at "1" and continuing until all nozzles are logged in) to the nozzle sensor 36. When the nozzle sensor 36 receives its location number, the LED 44 on the nozzle enclosure 30 is illuminated. The location number associated with that part of the boom 14 is displayed on the OI 18. Once a particular nozzle location is registered on the CAN network, that particular sensor 36 is disabled with respect to claiming a second location. Once each nozzle sensor 36 has claimed a physical location, the process does not require repeating unless a nozzle node module 30 is subsequently replaced or moved. In operation, the physical location of the sensor 36 is used to alert the operator of the location of clogs or other errors for inspection. Additionally, the location of each nozzle 26*a* is used by the system 10 for fluid flow synchronization, which is accomplished every 30 seconds. This synchronization is used to keep adjacent pulsing nozzles 26*a* operating 180 degrees out of phase and allows the CAN bus system to mimic the even/odd channel sequencing of the current Synchro® or Sharpshooter® systems marketed by Capstan Ag Systems, Inc. or the AIM Command® system marketed by Case, Inc.

Soft Boom Sections

The system 10 is designed to use every nozzle sensor 36 connected to the CAN bus 42. However, sometimes there are reasons to collectively control/monitor only the right wing, left wing, center section, or any other combination of nozzles 26*a* on the boom 14. To provide this capability to the operator, the system 36 has a number of "soft booms"; e.g., in one aspect of the invention, five (5). As discussed above, a soft boom is simply a programmable map in the OI 18 of each sensor location on the boom 14. In this sensor map, each nozzle 26*a* can be independently enabled or disabled. When disabled, the valve controlling solenoid 46 and the nozzle sensor 36 remain in a standby mode in which no liquid is sprayed; i.e., the nozzle sensor 36 is ignored by the system 10.

Each nozzle 26*a* can be enabled/disabled on any of the soft booms or multiple soft boom sections. For example, soft boom 14*a* might contain enabled nozzles 26*a* on the left half of the boom and disabled nozzles 26*a* on the right half of the boom, while soft boom 14*b* might contain enabled nozzles 26*a* on the right half and disabled nozzles 26*a* on the left half. However, all soft booms can be set to any combination of "on" nozzles. The OI 18 menus allow the selection of each soft boom and the setup of each boom. Once each soft boom is configured, it does not have to be configured again until a nozzle node module 30 is moved or replaced. The OI 18 can save a number of soft boom configurations.

Solenoid Pulse Valve Control

Each nozzle node module 30 is capable of operating its solenoid valve 46 at a unique frequency and duty cycle. In this example, the nozzle parameters are assigned in the OI 18 menus. When fully integrated into a sprayer controller system that may include target sensors, pre-defined maps or Global Positioning Systems (GPS), these parameters would be generated within and transmitted from a spray rate controller. With GPS integration, turning radius rate correction, individual nozzle swath overlap control, and individual nozzle rate control can be deployed.

In order to manipulate the flow rate (volume/time) of each nozzle with a goal of maintaining constant application rate (volume/area) on the ground, across the boom, while the machine is turning, messages on the CAN bus contain the target duty cycle of the nozzles at the boom's center based on the speed of the vehicle, the total number of nozzles, the nozzle spacing, and the radius of the turn; where left turns have negative values and right turns have positive values. Because each sensor node knows its location, it uses these values to calculate the radius of its turn relative to the machine. The equation for the nozzle turn radius with terms referenced to the left side of the boom is:

$$r = \left(R + \frac{s \cdot T}{2}\right) - (s(l - 0.5)). \quad (1)$$

where r is the radius of the sensor's turn, R is the radius of the machine's turn, T is the total number of nozzles on the boom, s is the nozzle spacing, and l is the location number of the specific nozzle. It then multiplies the ratio of its radius to the machine radius by the machine center's target duty cycle to calculate its desired duty cycle:

$$d = D\frac{r}{R}. \quad (2)$$

where d is the desired nozzle duty cycle and D is the target duty cycle of nozzles at the boom center based on vehicle speed. If the turning radius of the machine is less than half the length of the boom, the inside nozzles will travel backwards. This would result in a negative desired duty cycle. In this case the solenoid valve is simply turned off. By contrast, the outside nozzles would have a desired duty cycle of more than 100%. In this case the duty is set to 100% and the system simply under-applies chemical.

If the system pressure regulator is also attached to the CAN bus, it can be incorporated into the application control and simply increase the system pressure on a small radius turn. A rate controller then calculates a lower center target duty cycle in order to maintain the desired application rate. In this way, the outside nozzles never under-apply chemical simply because the machine executes a turn. The inside nozzles never over-apply as long as the system operates continuously. Turning radius is acquired from GPS output. Target duty cycle is acquired from a rate controller and is calculated from a ground speed sensor or GPS output.

Nozzle Monitoring

Monitoring of nozzle operation is based on a vibration measurement using a dual-axis accelerometer 36 coupled to the nozzle 26a. In one aspect, only one axis is used; i.e., the axis perpendicular to the spray fan sheet (also the axis of the direction of travel of the tractor 12). The sensor axis must be properly aligned perpendicularly with the spray nozzle fan for proper monitoring. Moreover, it is important that the sensor 36 be directly coupled or sufficiently close to the nozzle 26a so that the spray vibration is transferred to the sensor 36.

The algorithm for nozzle monitoring is relatively straightforward as described by the present inventor in U.S. patent application Ser. No. 10/786,614. Briefly, the microprocessor samples the accelerometer sensor at 25 kHz for 10 ms in order to collect 256 samples. (Note that this means that the system needs 10 ms of flow to operate properly, so 10% dc at 10 Hz is the lower limit for operation.) From this sample, a Discrete Fourier Transform (DFT) is used to create a power spectrum of the signal over a 1 kHz wide frequency band. The center frequency of the band can vary from 4 kHz to 7 kHz based on the calibration value.

Figure 15:
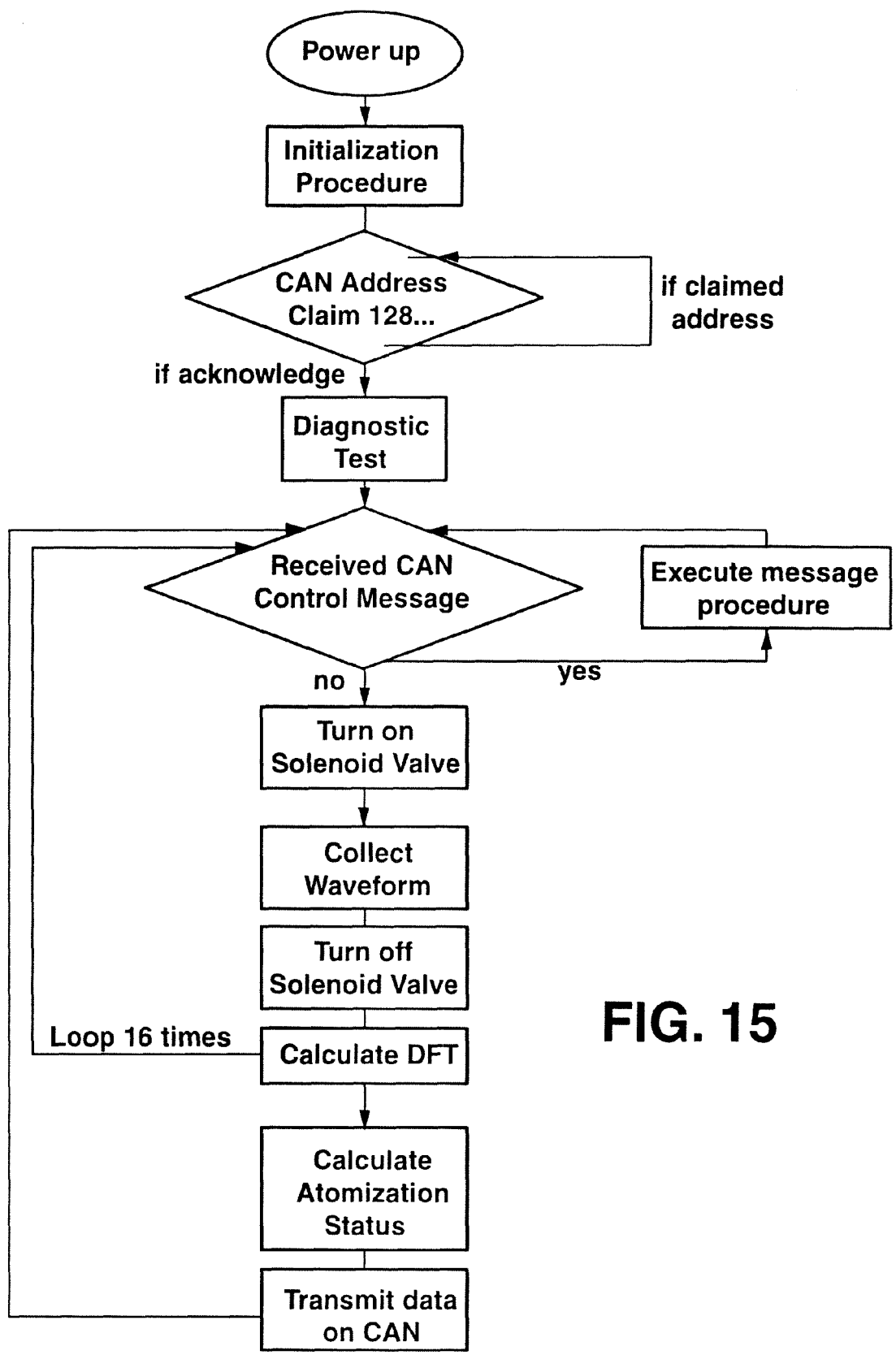
FIG. 15 is a flow chart showing program operation of a Nozzle Atomization Sensor Module, which communicates with a control area network in accordance with a further aspect of the present invention.

Because the response to vibration varies between nozzle types, nozzle sizes, fluid properties, and even between sensors, an individual calibration is required for each nozzle in this configuration in accordance with the program shown in FIG. 15. The system requires field calibration for the nozzle, pressure and fluid to be sprayed. This calibration consists of the operator turning on the spray and initiating the "Calibrate" routine on the OI 18. Each nozzle sensor 36 samples the vibration using the algorithm above. From this sample, a Discrete Fourier Transform (DFT) is used to create a power spectrum of the signal over the 3.5 to 7.5 kHz range with frequency bandwidths of 1 kHz. This is repeated 16 times. The sum of the 16 DFT's is used to determine the frequency band with maximum vibration. Previous tests have indicated these peaks to be in the 4-6 kHz range for most flat fan nozzles.

Upon selection of a frequency band, the microcontroller then pulses the nozzle at the configuration of solenoid frequency and duty cycle that was set for normal operation. In this normal operation mode, the microcontroller sums 64 DFT values and divides the 'normal' sum by 4 to determine a calibration curve. After calibration is complete, the operator is notified through the OI 18. Although FIG. 15 shows a data collection and DFT routine using a solenoid valve, the routine can also be employed to measure vibration for a continuous spray (no valve) system.

In operation while spraying, each microcontroller generates a signal to open the valve and executes a time delay to allow the valve to fully open and for spray flow to be established. After the delay, the microprocessor samples the signal from the accelerometer for the 10 ms period and calculates the DFT in the peak band that is established during calibration. The sum of 16 DFT's in the peak band is compared to the 'quiet' and 'normal' calibration values and is used to calculate the relative vibration on a linear scale ranging from 0 to 15. If the vibration is the same as during calibration, the relative vibration is 8 while lower vibration ranges from 0 to 7 and greater vibration ranges from 9 to 15.

Excessively low vibration indicates a partial or complete clog and the OI 18 alerts the operator of the problem and the location. Additionally, because some air induction nozzles increase in vibration when partially clogged, an excessive vibration, above that at calibration, can be interpreted as a potential problem requiring alerting the operator.

The operator can set the threshold of relative vibration by adjusting the sensitivity in the OI 18 setup menus. Additionally, operators can have direct and fast control over this sensitivity; the menu control can be replaced by a knob and calibrated (e.g., 1-10 scale) dial. The total time for sensor measurement and indication to the operator is the time of 16 solenoid pulses. Thus, at a solenoid frequency of 10 Hz, error detection time is 1.6 seconds. When the solenoids are not pulsing, in ON mode, the error detection time is 800 ms.

When the system is to be used with a conventional rate controller where pressure is adjusted to control rate, the system will interpret pressure changes as clogs if the above algorithm was used independently. There are at least two ways to compensate for this potential problem. The first method is to measure the boom pressure using a pressure transducer (not shown) interfaced to the CAN bus. The pressure value is used to scale the relative vibration valves. Although this method requires an algorithm, it can be developed from test data as in the foregoing aspect.

An alternative method according to another aspect of the invention is to check the status of adjacent nozzles when a clogged nozzle is detected. If the two nozzles adjacent to the clogged nozzle are indicating vibration levels similar to the suspected clogged nozzle, then the system concludes that the pressure or some other global system change has occurred. This would not be displayed to the user as a clogged nozzle, but another error message would be displayed on the OI 18. If a nozzle is detected as clogged, then the red LED 50a on the OI 18 is illuminated, the alarm is sounded, and the display indicates a nozzle clog. The location of the nozzle is displayed on the OI 18 and the LED 44 on the nozzle sensor module 30 is illuminated. The operator could use either or both methods to easily locate the nozzle with the problem.

The above description is for a fully integrated control/monitor system. For the system to be adapted for use as a monitor with existing Synchro®/Sharpshooter® or AIM Command systems (as marketed by Capstan Ag Systems, Inc. or Case, Inc., respectively) where the nozzle valve pulse trigger is created by an independent electronic system, synchronization of the 10 ms period sampling with the existing system's PWM valve actuation signal is required. This is achieved by bringing in a single signal from the even or odd pulsing channel to the OI 18. The low to high transition is used to synchronize the monitor system to the pulsing. Given a frequency of 10 Hz, then approximately half the nozzles are synchronized with the pulse and approximately half the nozzles are 50 ms out of synchronization. During the set up, the even/odd assignment is used to synchronize with the fluid pulses.

System Error Detection

As mentioned in the nozzle monitoring section, the OI 18 notifies the operator of nozzle clogs by illuminating the red LED 50a, sounding an alarm, and displaying the error on the LCD 54. In addition to this capability, the system can detect other errors.

When all is well (when the nozzle monitoring system is on and no errors are detected) the green LED 50c is illuminated and the display 54 scrolls through the nozzle location numbers with an indication of 'OK' at a rate of 2 per second. If 2 or more adjacent nozzles are indicating low or high vibration, a yellow LED 50b is illuminated and those locations are displayed as 'LOW' or 'HIGH' as the display 54 scrolls through the nozzle location numbers. The yellow LED 50b is also used to indicate any instance when the system is not monitoring (when a toggle switch 51 is set to standby mode or when the system setup menus are open).

The red LED 50a and the display 54 are also used to indicate system functionality errors. Upon power up, the sensor microcontrollers execute a diagnostic test in which the input voltage, solenoid 'click', accelerometer operation, amplifier functionality, and calibration values are tested. If any errors are detected, messages containing the type of error, location, and detailed error information are sent to the OI 18 and used to notify the operator. Calibration value errors are also checked upon the completion of a calibration.

The current design is based on a microprocessor at each nozzle node 16. This microprocessor handles valve actuation, monitoring of valve and nozzle operation and CAN communication. Each nozzle can be individually addressed and operate at a distinct frequency and duty cycle. If needed to reduce system cost or complexity, a number of adjacent nozzles can be monitored and controlled by a single microprocessor and cables for valve actuation and accelerometer sensing can be routed from the microprocessor nodes to individual nozzles. The individual nozzles do require an accelerometer and pulse valve.

Field Testing

The nozzle sensing technique was tested on a number of correctly operating nozzles and on a number of malfunctioning nozzles. Additionally, the networked system has been installed on a self-propelled sprayer (not shown) to test the operation during spray system operation.

EXAMPLE NO. 1

Characteristic vibration of the spray atomization process was investigated using a single nozzle test stand, a multiple nozzle test stand and a commercial, self-propelled field sprayer (Case 4260, CNH Global). The single nozzle test stand used air-pressured canisters for liquid flow; this eliminated any vibration from pumps and bypass flow in the system. The multiple (3) nozzle test stand used an electric vane pump and allowed various configurations of pulsing flow to be generated. Data from the multiple (3) nozzle test stand were compared to the single nozzle stand. Pump and pipe flow vibrations were not found to affect the nozzle vibration measurements. Detailed results of the testing are provided in the report, "Sensing Spray Nozzle Vibration as a Means for Monitoring Operation," by D. K. Giles, presented at ILASS Americas, 17th Annual Conference on Liquid Atomization and Spray Systems, Arlington, Va., May 2004.

The primary instrument for data collection in these examples was an ICP triaxial accelerometer (PCB Model 356A22) with frequency response of 0.4 Hz to 6 kHz, 0.4 to 10 kHz (sensitive) and nominal output of 100 mV/g. The accelerometer 36 was mounted in the module 30 as shown in FIG. 2.

In FIG. 5*a*, reference axes as used in this application are shown. In particular, the Z direction as used herein is the direction of flow through the nozzle 26*a*. In the most common field spraying applications, this Z-axis is vertically downward. The X direction, on the other hand, is horizontal provided that the Z direction is vertical. In other words, the X direction is perpendicular to the Z direction and extends left to right when facing a front of the nozzle 26*a*. The Y-axis is the remaining axis and is perpendicular to the plane in which the spray pattern is contained. When the nozzle 26*a* is traversed over a field as shown in FIG. 1, the Y-axis is parallel to the direction of travel and perpendicular to the plane of the "flat fan" spray pattern emitted from the nozzle.

The accelerometer 36 was coupled to a 4-channel ICP charge amplifier/signal conditioner (PCB Model 482A22). Data were collected from the amplifier using a multi-channel A/D card (National Instruments DAQ Series) installed in a laptop computer. For some experiments (using other accelerometers), additional signal conditioning was done with commercial modules (Analog Devices 55B series and National Instruments SCC series modules). National Instruments LabView® software was used for data collection and some spectral analysis. Custom software, using standard FFT (Fast Fourier Transform) methods was written for additional spectral analysis. After initial pilot studies to find the range of frequencies of interest, the sampling rate was set at 20 kHz and allowed spectral analysis up to 10 kHz under the Nyquist criteria. A typical sampling period was 200 ms; this yielded 4000 data points per channel, a spectral resolution of 5 Hz and in the case of 15 Hz pulsing flow, included 2 complete valve cycles and spray pulsation. A number of single axes "teardrop" accelerometers (PCB Model 39941) with calibrated frequency response to 10 kHz were used to confirm triaxial accelerometer data beyond the 6 kHz range.

A series of tests with nozzles of various flow capacities (0.1 to 1.0 gal/min nominal), angles (80 and 110 deg) and various operating pressures (150-500 kPa or approximately 20-80 psi) was conducted. During all continuous non-pulsating flow tests, a standard diaphragm check valve was installed on the turret-type nozzle body (FIG. 2). The results of various test runs are described in detail by the present inventor in U.S. patent application Ser. No. 10/786,614. Briefly, the trends and conclusions are:

- Vibration profiles were stable and very repeatable.
- X-axis vibration was minimal
- Y-axis vibration was the most significant and centered in the 5.2 to 5.4 kHz bands.
- Z-axis vibration was substantial and was more widely dispersed across bands than Y-axis.
- Amplitude of vibration was correlated with and significantly increased with flow rate.
- Differences between nozzles were easily distinguished both in time and frequency domains.

Referring now to FIGS. 5B through 5Q, various spray patterns are shown. Specifically, FIGS. 5B through 5K illustrate nozzles having a flow angle of 80%. The nozzles shown in 5K through 5Q, on the other hand, have a flow angle of 110%. FIGS. 5B through 5D illustrate a nozzle having a normal flow rate of 0.1 gal/min. In FIGS. 5B through 5I, the standard flow rate is 0.4 gals/min, while in FIGS. 5J through 5N, the flow rate of the nozzle under standard working conditions is 0.8 gals/min. The flow rate of the nozzles shown in FIGS. 5O through 5Q when operating properly is 1.0 gals/min.

The nozzles illustrated in FIGS. 5B, 5E, 5J, 5L and 5O are intended to show nozzles operating properly. The remaining nozzles, however, have been clogged in order to change the spray pattern and/or the flow rate. For instance, the nozzle illustrated in FIG. 5C is at 30% flow while the nozzle illustrated in FIG. 5D is at 87% flow. The nozzle illustrated in FIG. 5F is at 64% flow; the nozzle illustrated in FIG. 5G is at 52% flow; the nozzle illustrated in FIG. 5H is at 34% flow; the nozzle illustrated in FIG. 5I is at 96% flow; and the nozzle illustrated in FIG. 5K is at 47% flow. The nozzle illustrated in FIG. 5M is at 113% flow and the nozzle illustrated in FIG. 5N is at 114% flow. Finally, the nozzle illustrated in FIG. 5P is at 77% flow, while the nozzle illustrated in FIG. 5Q is at 48% flow.

The vertical axis is the scaled output from the analysis of the vibration sensed by the accelerometer and analyzed by the microprocessor. The output is the integral of the spectral density within a 1 kHz frequency window centered at the peak frequency as determined by the microprocessor.

EXAMPLE NO. 2

The nozzle control and monitor system depicted in FIGS. 2, 3 and 4 was installed on a self-propelled sprayer and operated while spraying a fallow field. The spray boom was outfitted with the system components and tested with flat fan agricultural spray nozzles. For the tests reported here, the nozzle used was a 110-degree nozzle with a flow rate of 0.6 gpm when operated at 40-psi liquid pressure. During the operation, the Fourier transformed vibration was recorded from each sensor at approximately one-second intervals; the average vibration and the standard deviation of the vibration value was calculated for all the nozzles. Vibration was linearly scaled to arbitrary units.

Figures 7A, 7B:
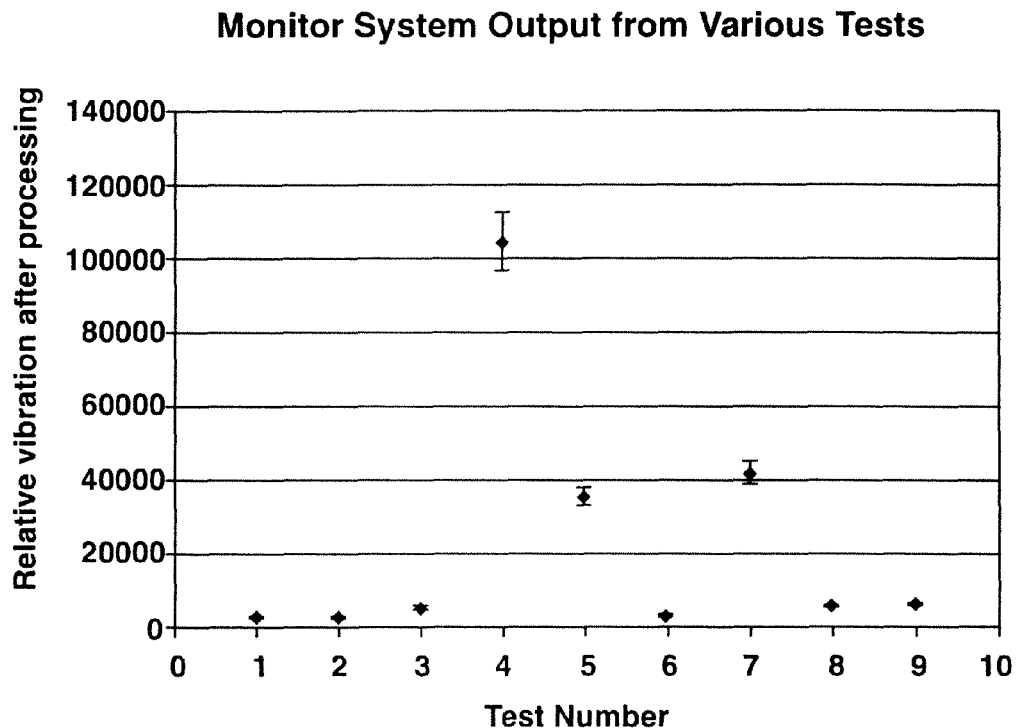
FIGS. 7A and 7B are nozzle results obtained in the examples described herein.
Figure 8A:
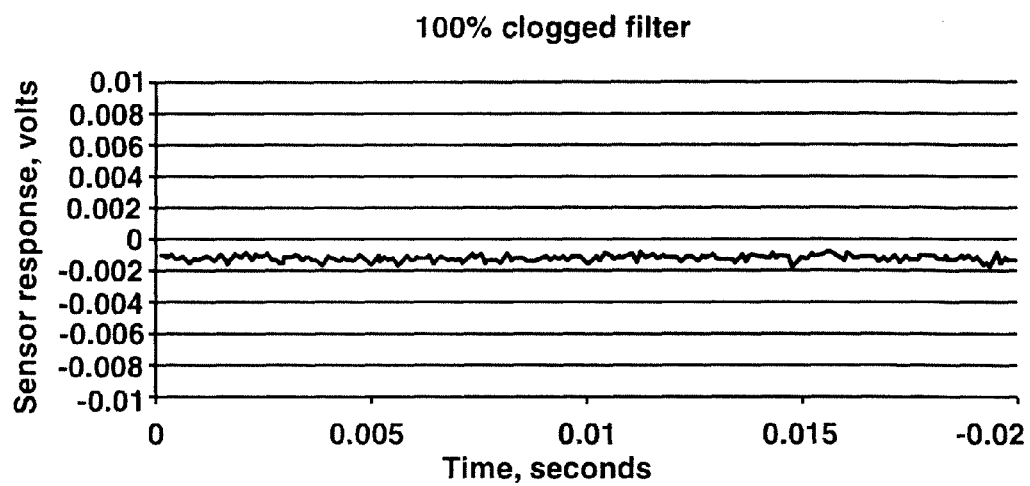
FIGS. 8A through 8D are filter results of data from a pump obtained in the examples described herein.
Figure 8B:
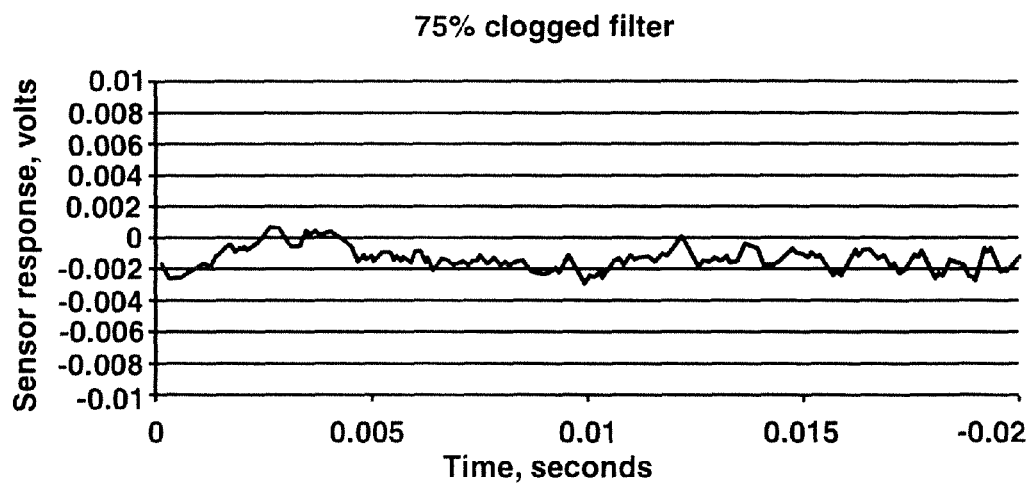
Figure 8C:
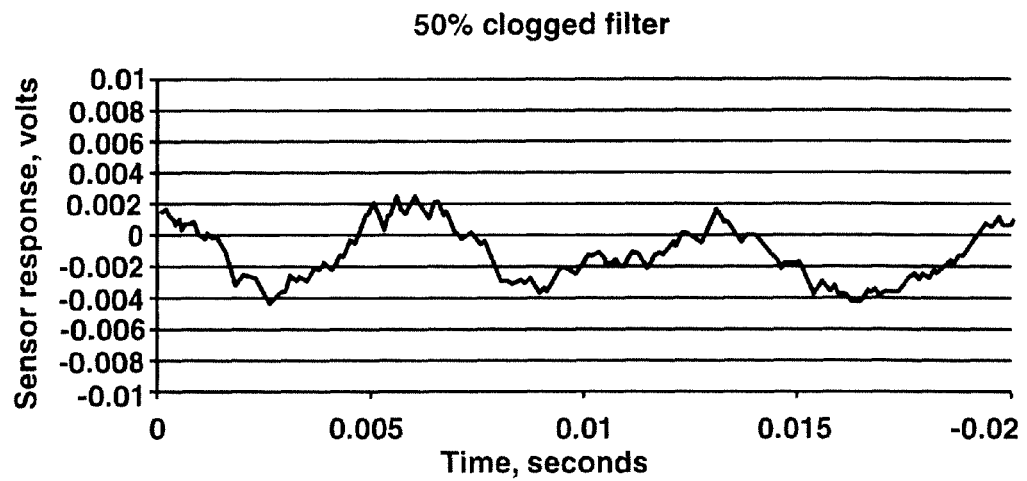
Figure 8D:
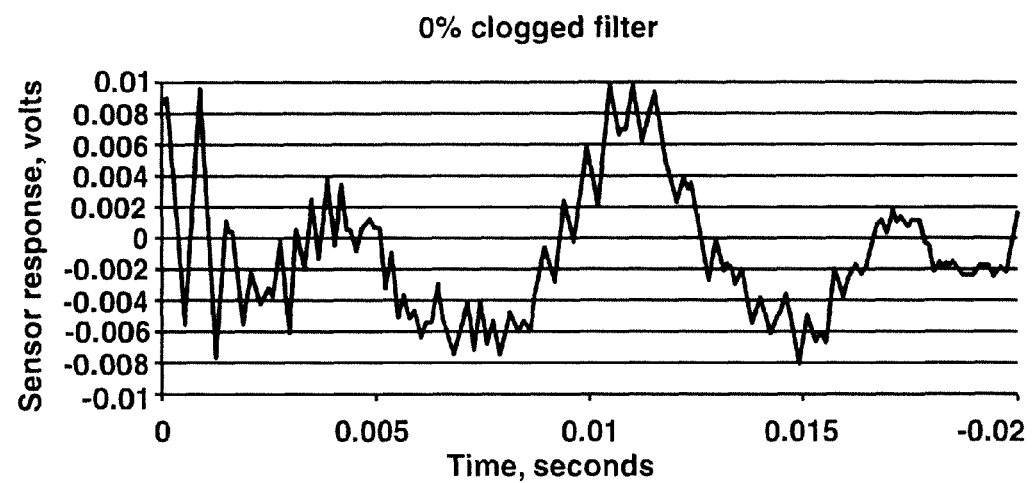

A number of typical conditions were tested and the results are shown in FIG. 7A for the specific conditions described in FIG. 7B. The test numbers in the horizontal axis of FIG. 7A correspond to the test numbers in the leftmost column of FIG. 7B. Performance of the system can be evaluated by the range of vibration values observed and the relationship between the vibration values for each test, especially considering the standard deviation.

For example, compare the results from Test No. 6, where the vehicle is in motion but with the spray turned off to Test No. 7 where the vehicle is motion but the spray nozzles are operating. This comparison shows the magnitude of spray nozzle vibration in comparison to the background vibration from the vehicle's engine, drive train and liquid system. The nozzle vibration, when spraying properly averages 42,017 versus 3,069 for no spraying. The condition of spraying versus no spraying is very easily detected by this over 10-fold difference in vibration. This result, in light of the data presented in U.S. patent application Ser. No. 10/786,614, confirms that the measurement algorithm of determining the peak spray vibration frequencies in the 4 kHz range can be used to discriminate from background vehicle vibration that tends to be in the 2-100 Hz range.

Another example can be drawn in comparing the results from Test No. 9, where the clogged nozzles were operated while the vehicle was in motion, to Test No. 7, where the nozzles were operating properly. The vibration difference of properly operating nozzles versus clogged nozzles was 42,017 versus 6289, a 7-fold difference. A clogged nozzle would be easily discriminated from a boom of properly operating nozzles.

Further support for the nozzle-monitoring algorithm can be seen by inspecting the results from Test Nos. 1, 2 and 6 where the vehicle is in various configurations (stationary with engine off, stationary with engine, engine on and vehicle in motion). In all cases, the vibration values are in the 2,000-3,000 range, typically one order of magnitude below the values for the vibration when the nozzles were properly operating.

EXAMPLE NO. 3

In addition to monitoring the proper operation of spray nozzles in a spraying system, the technique can be used to monitor the proper operation of other flow components, such as filters and pumps. While the monitoring of rotational components such as bearings, fans and the like by vibration is a technique well known in the art, the use of vibration as a means to detect partial clogging of a liquid system filter is an integral and new capability for the networked spray monitor.

Figure 9:
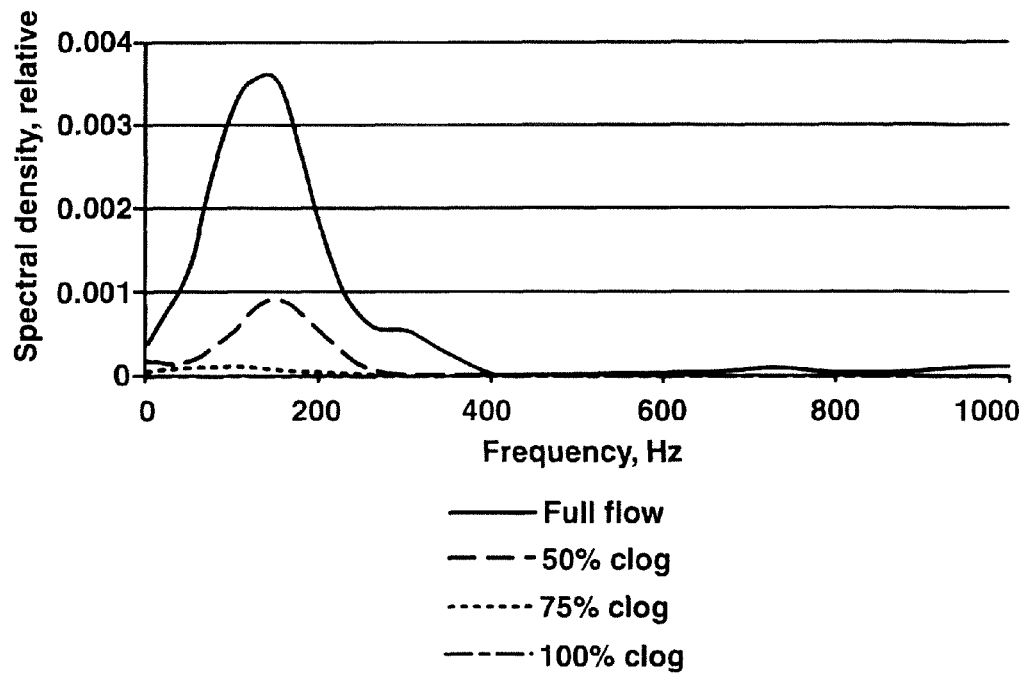
FIG. 9 is a spectral density graph of vibrations related to the filters as in FIGS. 8A-8D.
Figure 10:
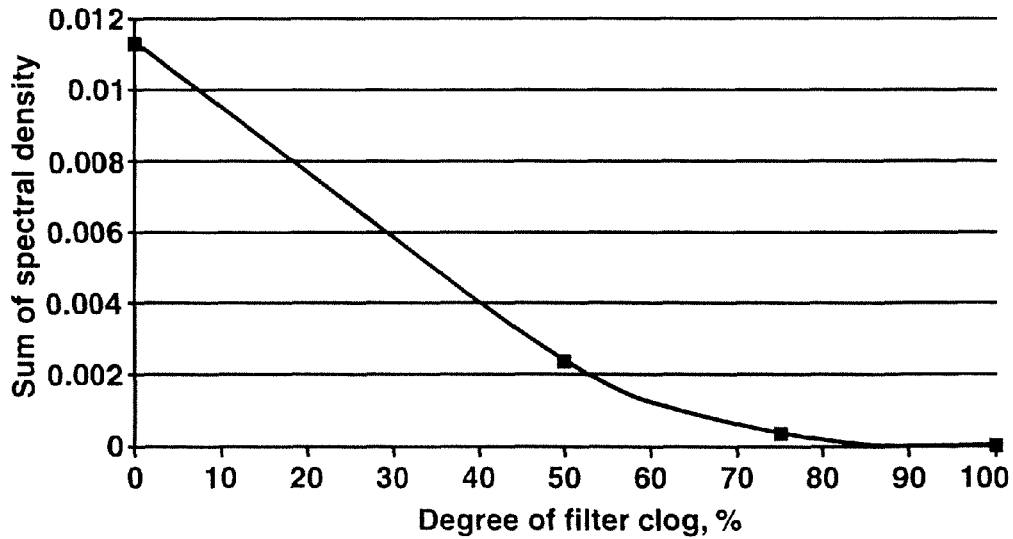
FIG. 10 is a clog intensity graph related to the filters as in FIGS. 8A-8D.
Figure 11:
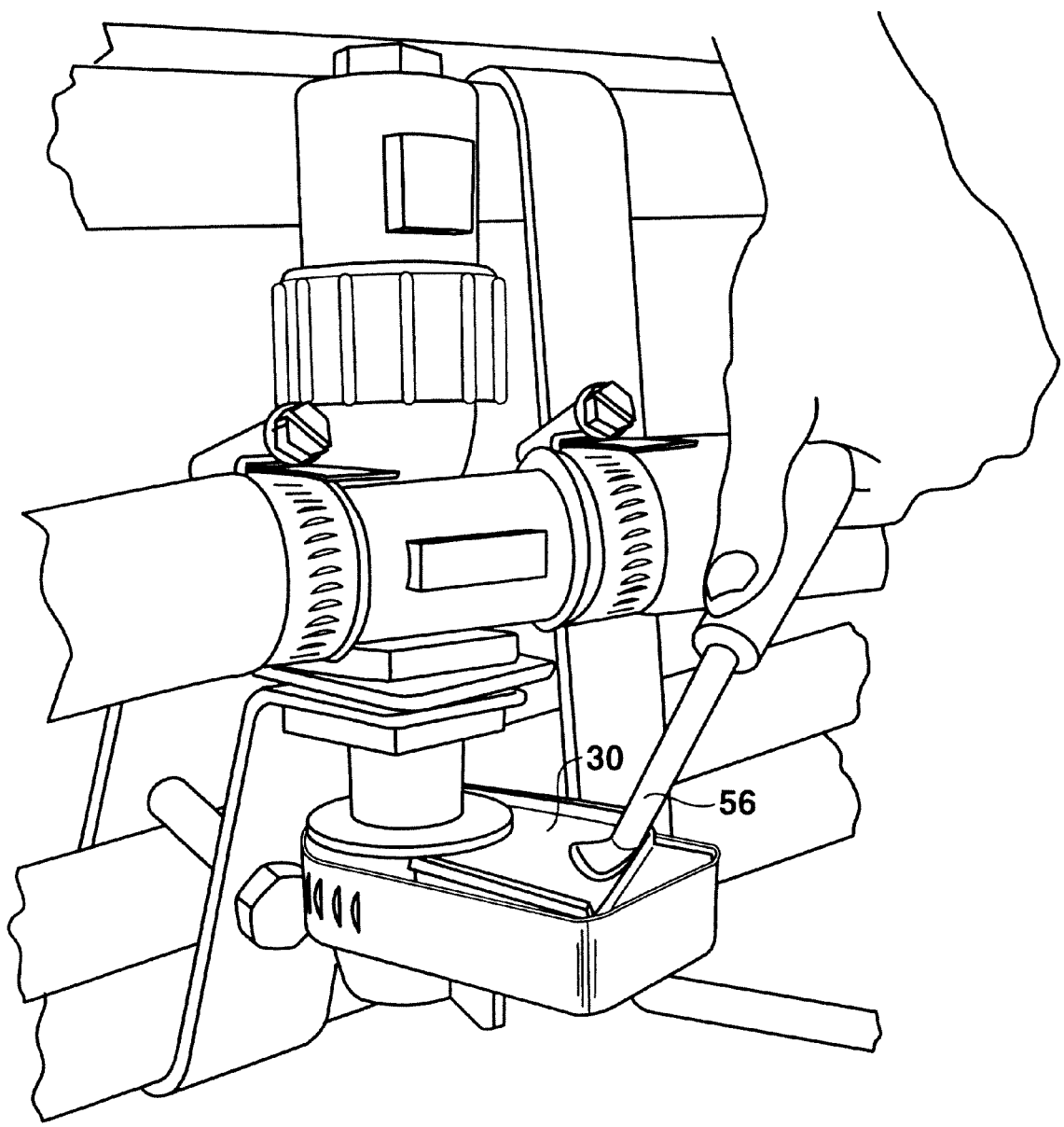
FIG. 11 is a perspective view of a vibrator used to actuate and register a nozzle as in FIG. 2 in accordance with another aspect of the invention.
Figure 12:
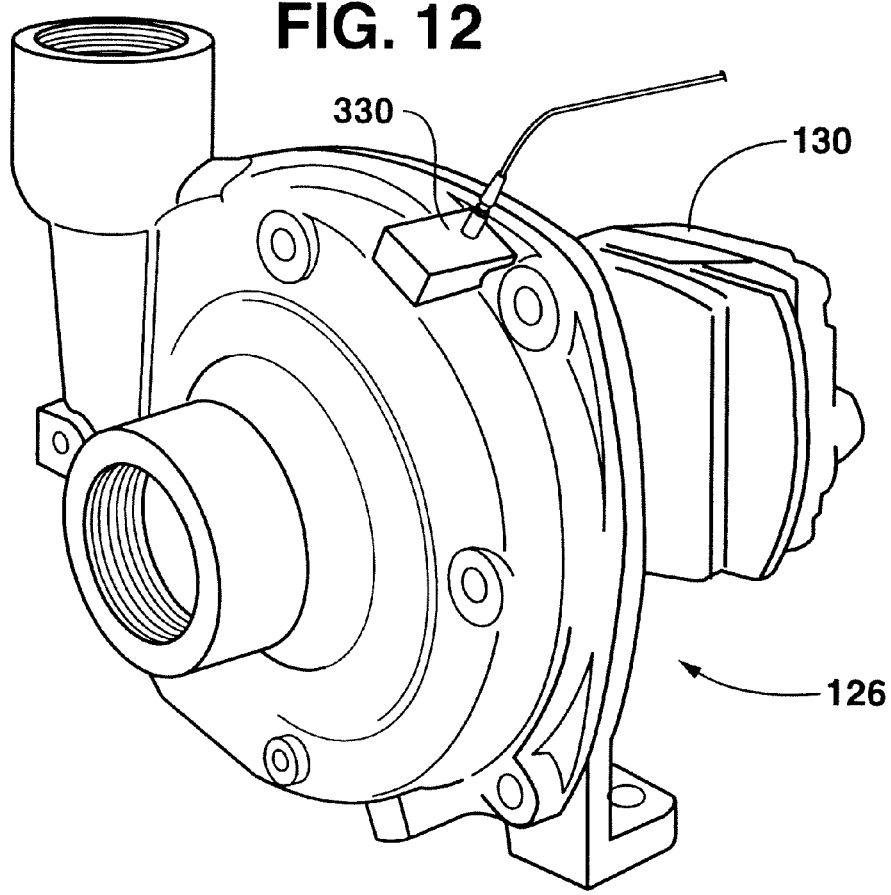
FIG. 12 is a perspective view of a pump employed in the agrochemical dispensing system of FIG. 1 in accordance with an additional aspect of the present invention.
Figure 13:
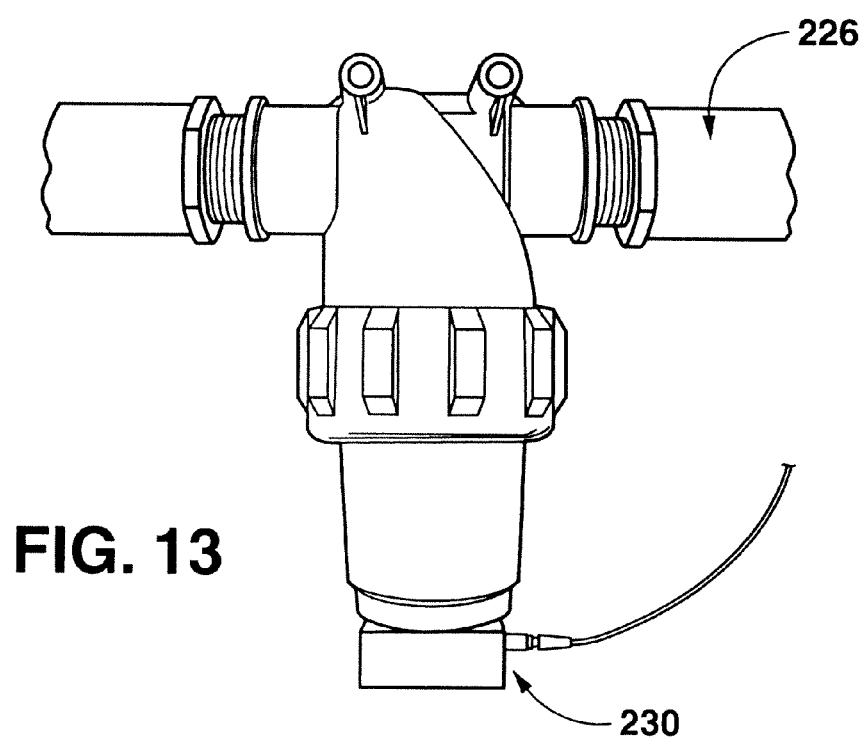
FIG. 13 is a perspective view of a filter employed in the agrochemical dispensing system of FIG. 1 in accordance with another aspect of the present invention.

The technique was investigated as a clogged filter detector. An accelerometer was coupled to the base of a common agricultural spray filter housing (1" Arag filter housing). Clogged filter elements were then created by coating a portion of the filter element with epoxy glue to create an impassible flow path. The filter was supplied with pressurized water at 60 psi and the resulting vibration for each condition (0%, 50%, 75% and 100% clogged filters) was recorded. The resulting data in the time domain are shown in FIGS. 8A-8D and in the frequency domain (spectral density) are shown in FIG. 9. The distinction in the vibration of liquid flow through the filter is easily seen. A spectral density analysis (FIG. 9) confirms the distinction between the filter conditions. The relationship between the degree of filter clogging the integral of the power spectrum in the 0 to 400 kHz band is shown in FIG. 10.

In other embodiments, the system of the present invention will include a simple panel that, for instance, may include a series of audible and/or visible alarms that indicate when a nozzle is malfunctioning. In this embodiment, data analysis, processing, initializing and other system functions remain transparent as possible to the operator.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged either in whole or in part. Furthermore, those of ordinary skill in the art will appreciate that the foregoing description is by way of example only, and is not intended to limit the invention so further described in such appended claims.

That which is claimed is:

1. A method of actuating and controlling a networked spraying system, the method comprising the steps of:
    providing a plurality of nozzles spaced apart from each other, each nozzle configured to emit an agrochemical according to a predetermined spray pattern and application rate;
    attaching a plurality of vibration sensors adjacent respective nozzles; and
    initializing the nozzles in a control area network through a physical registration process to enable the control area network to selectively monitor and control each of the nozzles or a designated group of the nozzles, wherein the physical registration process is initiated proximate the nozzles.

2. The method as in claim 1, further comprising at least one processor in communication with the vibration sensors, the processor configured for converting respective electronic registrations of the nozzles to respective spray boom locations of the nozzles.

3. The method as in claim 2, wherein the step of initializing the nozzles occurs by tapping proximate each of the vibration sensors, the processor configured for associating the tapping with the respective electronic registrations of the nozzles and converting the electronic registrations to the respective spray boom locations.

4. The method as in claim 2, wherein the step of initializing the nozzles occurs by placing a vibrator proximate each of the vibration sensors, the vibrator configured to vibrate at a preselected frequency to activate the respective electronic registration of the respective nozzle, the processor configured for associating the preselected frequency with the respective nozzle and for converting the respective electronic registration to the respective spray boom location.

5. The method as in claim 2, wherein the processor is in communication with an operator interface that includes an interactive display configured for an operator to enable, disable and monitor each nozzle.

6. The method as in claim 1, further comprising the step of providing respective indicators associated and located with each nozzle, each indicator configured to indicate registration of the respective nozzle in the control area network or to indicate a nozzle problem to the operator.

7. The method as in claim 6, wherein each indicator is an LED disposed proximate the respective nozzle.

8. The method as in claim 1, further comprising the step of controlling a spray pattern, atomization or flow rate from at least one of the nozzles as the networked spraying system turns through a radius.

9. The method as in claim 1, wherein at least one of the nozzles is a pulsating nozzle.

10. The method as in claim 1, wherein all of the plurality of nozzles comprise pulsating nozzles.

11. The method as in claim 1, wherein each of the nozzles defines a Z-axis that comprises the direction of flow of a fluid through the nozzle, an X-axis that is perpendicular to the Z-axis and extends left and right of the nozzle when facing a front of the nozzle, and a Y-axis that is perpendicular to the Z-axis and the X-axis, the respective vibration sensor sensing vibrations in at least one of the Z-axis direction, the X-axis direction, or the Y-axis direction.

12. The method as in claim 11, wherein at least one of the vibration sensors senses vibrations in the Z-axis direction for conveying information to the operator regarding a flow rate of a fluid being emitted by the respective nozzle.

13. The method as in claim 1, wherein at least one of the vibration sensors is a piezoelectric device.

14. The method as in claim 1, wherein at least one of the vibration sensors is configured to sense vibration at frequencies between 500 Hz and 10,000 Hz.

15. The method as in claim 1, further comprising a solenoid valve coupled to at least one of the nozzles, the solenoid valve configured to pulsate a liquid flow through at least one nozzle.

* * * * *